(12) United States Patent
Mitsuishi et al.

(10) Patent No.: US 10,272,945 B2
(45) Date of Patent: Apr. 30, 2019

(54) VEHICLE STEERING CONTROL DEVICE

(71) Applicant: NSK LTD., Tokyo (JP)

(72) Inventors: Nobuhiro Mitsuishi, Gunma (JP); Sakae Nejo, Gunma (JP); Sumio Sugita, Kanagawa (JP); Tomonori Sato, Gunma (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 16/072,272

(22) PCT Filed: Feb. 9, 2017

(86) PCT No.: PCT/JP2017/004783
§ 371 (c)(1),
(2) Date: Jul. 24, 2018

(87) PCT Pub. No.: WO2017/138617
PCT Pub. Date: Aug. 17, 2017

(65) Prior Publication Data
US 2019/0023318 A1 Jan. 24, 2019

(30) Foreign Application Priority Data

Feb. 12, 2016 (JP) ................. 2016-025246

(51) Int. Cl.
B62D 5/04 (2006.01)
B62D 6/00 (2006.01)
B62D 5/00 (2006.01)

(52) U.S. Cl.
CPC ............ B62D 6/008 (2013.01); B62D 5/008 (2013.01); B62D 5/0463 (2013.01); B62D 5/0472 (2013.01); B62D 6/002 (2013.01)

(58) Field of Classification Search
CPC ...... B62D 6/008; B62D 5/008; B62D 5/0463; B62D 5/0472; B62D 6/002
See application file for complete search history.

(56) References Cited

U.S. PATENT DOCUMENTS

2017/0341679 A1* 11/2017 Ikegaya ................. B62D 5/003
2018/0065657 A1* 3/2018 Hirate .................... B62D 5/008
(Continued)

FOREIGN PATENT DOCUMENTS

JP 2009-120003 A 6/2009
JP 2010-280313 A 12/2010
JP 2012-056399 A 3/2012

OTHER PUBLICATIONS

International Search Report for PCT/JP2017/004783 dated Apr. 11, 2017 [PCT/ISA/210].

(Continued)

Primary Examiner — Kevin Hurley
Assistant Examiner — Marlon A Arce
(74) Attorney, Agent, or Firm — Sughrue Mion, PLLC

(57) ABSTRACT

To provide a vehicle steering control device capable of alleviating discomfort caused by mismatch between a steering angle of a steering wheel and a steered angle of a drive wheel generated by automatic steering using an EPS device. The vehicle steering control device has a first steering assist mode of assisting driver's steering and a second steering assist mode of performing steering independently from the driver's steering. A second controller, performs phase shift suppression control to suppress a relative shift of a phase of a differential mechanism on a steering wheel side with respect to a reference phase on the steering wheel side of the differential mechanism corresponding to a phase on a rack-and-pinion side of the differential mechanism in the first steering assist mode.

7 Claims, 12 Drawing Sheets

(56) References Cited

U.S. PATENT DOCUMENTS

2018/0072343 A1* 3/2018 Sugita ................. B62D 5/008
2018/0201306 A1* 7/2018 Tsubaki ............... B62D 5/0409

OTHER PUBLICATIONS

International Preliminary Report On Patentability dated Mar. 9, 2018 (PCT/IPEA/409).

* cited by examiner

VEHICLE STEERING CONTROL DEVICE

CROSS REFERENCE TO RELATED APPLICATIONS

This application is a National Stage of International Application No. PCT/JP2017/004783 filed Feb. 9, 2017, claiming priority based on Japanese Patent Application No. 2016-025246 filed Feb. 12, 2016.

FIELD

The present invention relates to a vehicle steering control device.

BACKGROUND

There is a so-called electric power steering (EPS) device that assists steering using a steering assist motor in order to reduce a vehicle steering force in so-called automobiles such as passenger cars and trucks. In the EPS device, a driving force of a steering assist motor is applied, as an assist force, to a steering shaft or a rack shaft by a transmission mechanism, which is a gear, a belt, or the like, via a speed reducer. For the purpose of enabling a steering angle ratio, which is a ratio of a steering angle of a steering wheel and a steered angle of a drive wheel, to be variably controlled and lowering a risk of a collision with an object around the vehicle in such an EPS device, a technique of changing the steering angle ratio in accordance with a distance from the object, a relative speed, and a distance until reaching the object is disclosed (for example, see Patent Literature 1).

CITATION LIST

Patent Literature

Patent Literature 1: JP 2012-056399 A

SUMMARY

Technical Problem

In recent years, the EPS device is adapted not only for steering assist to reduce a steering force of a vehicle but also for automatic steering for the purpose of avoiding a collision of a vehicle, for example. That is, for example, when an obstacle is detected by a sensor mounted on the vehicle, the EPS device controls a drive wheel to perform emergency avoidance steering to avoid a collision with the obstacle. The automatic steering including such emergency avoidance steering is performed without having regularity in the steering angle of the steering wheel and the steered angle of the drive wheel. Thus, when returning from the automatic steering, a shift occurs between the steering angle of the steering wheel and the steered angle of the drive wheel, which is a factor that makes a driver feel discomfort and unease.

The present invention has been made in view of the above description, and an object thereof is to provide a vehicle steering control device capable of alleviating discomfort caused by a mismatch between a steering angle of a steering wheel and a steered angle of a drive wheel generated by automatic steering using an EPS device.

Solution to Problem

To solve the above problem and achieve the above object, a vehicle steering control device includes a first controller that controls a speed reduction mechanism in a steering mechanism in which a steering wheel and a rack-and-pinion that steers and drives a drive wheel are connected via a differential mechanism and the speed reduction mechanism is provided between the rack-and-pinion and the drive wheel, and a second controller that controls the differential mechanism in the steering mechanism. A first steering assist mode of assisting steering of a driver and a second steering assist mode of performing steering independently from the steering of the driver are provided as operation modes of the first controller and the second controller, and the second controller performs phase shift suppression control to suppress a relative shift of a phase on a side of the steering wheel of the differential mechanism with respect to a reference phase on the side of the steering wheel of the differential mechanism corresponding to a phase on a side of the rack-and-pinion of the differential mechanism in the first steering assist mode.

With the above configuration, it is possible to alleviate the discomfort caused by the mismatch between the steering angle of the steering wheel and the steered angle of the drive wheel generated by the steering angle displacement suppression control in the first steering assist mode.

Further, as a desirable embodiment, a reference correlation defining the reference phase on the side of the steering wheel of the differential mechanism corresponding to the phase on the side of the rack-and-pinion of the differential mechanism and a correlation allowable region of the phase on the side of the steering wheel of the differential mechanism with respect to the reference phase are preferably prescribed in the second controller, and the second controller preferably performs the phase shift suppression control in the first steering assist mode such that the phase on the side of the steering wheel of the differential mechanism falls within the correlation allowable region.

With the above configuration, it is possible to suppress the generated relative shift of the phase on the steering wheel side of the differential mechanism with respect to the reference phase by the steering angle displacement suppression control.

Further, as a desirable embodiment, the second controller preferably performs the phase shift suppression control when the phase on the side of the steering wheel of the differential mechanism deviates from the correlation allowable region.

With the above configuration, it is possible to alleviate the discomfort caused by the mismatch between the steering angle of the steering wheel and the steered angle of the drive wheel generated by the steering angle displacement suppression control in the first steering assist mode when the phase on the steering wheel side of the differential mechanism deviates from the correlation allowable region.

Further, as a desirable embodiment, the second controller preferably sets the reference phase as a target phase in the phase shift suppression control.

With the above configuration, it is possible to make the phase on the steering wheel side of the differential mechanism coincide with the reference phase.

Further, as a desirable embodiment, the second controller preferably controls the differential mechanism at an angular velocity in accordance with a control amount in the phase shift suppression control until the phase on the side of the steering wheel of the differential mechanism reaches the target phase.

With the above configuration, it is possible to perform control in consideration of the influence on the driver's intentional steering of the steering wheel.

Further, as a desirable embodiment, the second controller preferably decreases the angular velocity as the control amount increases, and preferably increases the angular velocity as the control amount decreases.

With the above configuration, when the control amount in the phase shift suppression control is large, it is possible to suppress rapid rotation of the steering wheel and to reduce the influence on the driver's intentional steering of the steering wheel.

Further, as a desirable embodiment, the second controller preferably changes a target phase in the phase shift suppression control in accordance with a direction of a change of the phase on the side of the steering wheel of the differential mechanism.

With the above configuration, it is possible to perform control in consideration of the steering direction of the steering wheel by the driver.

Further, as a desirable embodiment, the second controller preferably sets a predetermined phase that coincides with the direction of the change of the phase on the side of the steering wheel of the differential mechanism, as the target phase in the phase shift suppression control.

With the above configuration, it is possible to make the steering direction of the steering wheel by the driver coincide with the changing direction of the phase on the steering wheel side of the differential mechanism by the phase shift suppression control.

Further, as a desirable embodiment, the second controller preferably performs the phase shift suppression control when the phase on the side of the steering wheel of the differential mechanism changes.

With the above configuration, it is possible to execute the phase shift suppression control in which the steering direction of the steering wheel by the driver and the change direction of the phase on the steering wheel side of the differential mechanism by the phase shift suppression control are made to coincide with each other only when the driver is steering the steering wheel, and it is possible to reduce the influence on the driver's intentional steering of the steering wheel.

Further, the first steering assist mode and the second steering assist mode may be configured to be switched based on an external command.

Advantageous Effects of Invention

According to the present invention, it is possible to provide the vehicle steering control device capable of alleviating the discomfort caused by the mismatch between the steering angle of the steering wheel and the steered angle of the drive wheel generated by the automatic steering using the EPS device.

DESCRIPTION OF EMBODIMENTS

Modes for carrying out the present invention (embodiments) will be described in detail with reference to the drawings. The present invention is not limited by the content described in the following embodiments. In addition, constituent elements to be described hereinafter include one which can be easily assumed by those skilled in the art and one which is substantially the same. Further, the constituent elements to be described hereinafter can be appropriately combined.

(First Embodiment)

Figure 1:
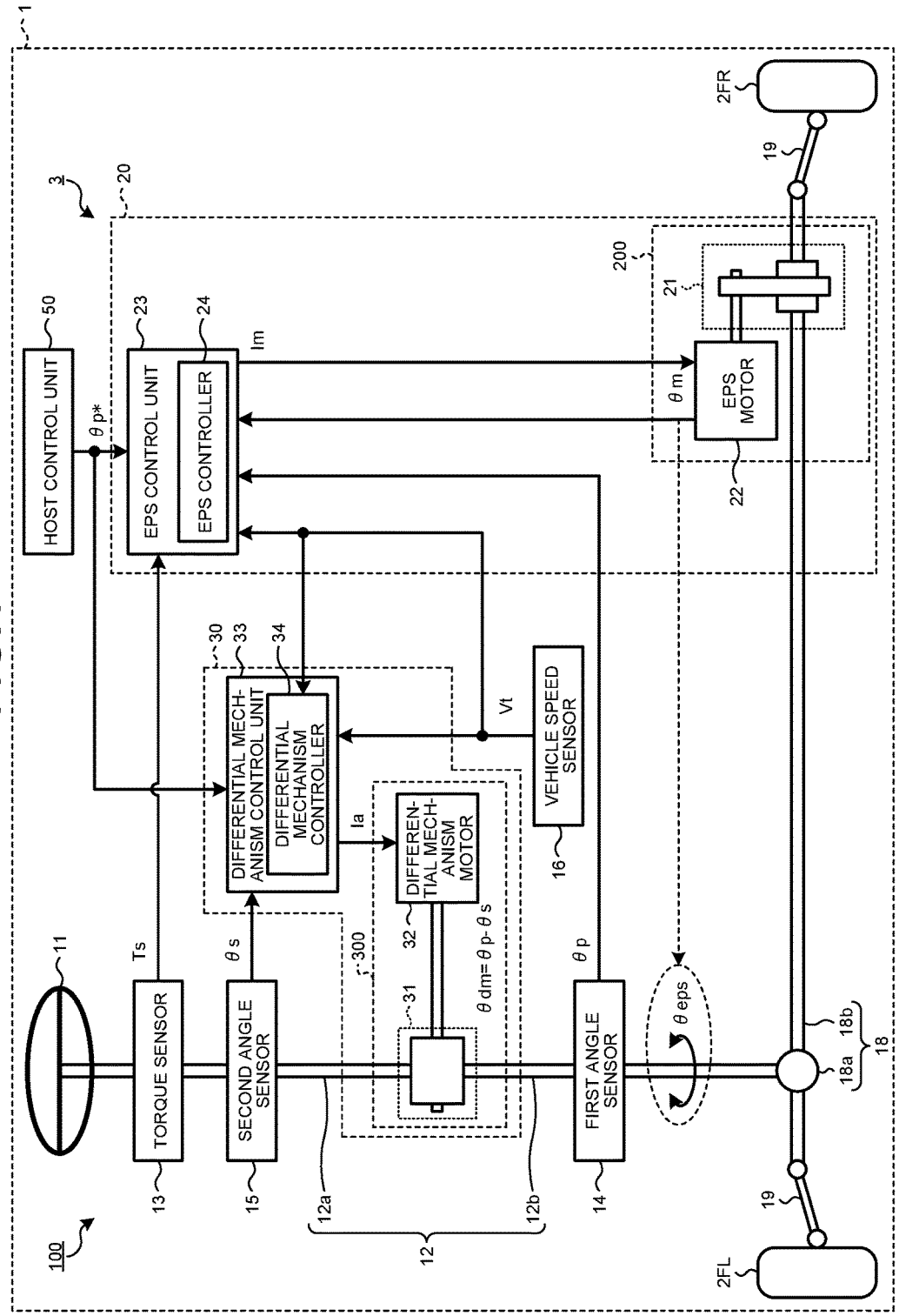
FIG. 1 is a diagram illustrating a configuration example of a vehicle steering control device according to a first embodiment.

FIG. 1 is a diagram illustrating a configuration example of a vehicle steering control device according to a first embodiment. In the example illustrated in FIG. 1, a left drive wheel 2FL and a right drive wheel 2FR, which are left and right steerable wheels, are steered by steering of a steering wheel 11 performed by a driver and control by a vehicle steering control device 3 in a vehicle 1. The steering wheel 11, the left drive wheel 2FL, and the right drive wheel 2FR are connected via a steerable shaft 12, a rack-and-pinion 18, and tie rods 19, thereby constituting a steering mechanism 100.

The rack-and-pinion 18 is constituted by a pinion 18a and a rack 18b and steers and drives the left drive wheel 2FL and the right drive wheel 2FR connected to both ends of the rack 18b, respectively, via the tie rods 19.

The steerable shaft 12 is constituted by a steering shaft 12a on the steering wheel 11 side and a pinion shaft 12b on the rack-and-pinion 18 side, and the steering shaft 12a and the pinion shaft 12b are mechanically connected via a differential mechanism 31 to be described later. Incidentally, each of the steering shaft 12a and the pinion shaft 12b may be configured by connecting a plurality of torsion bars via a universal joint.

The pinion shaft 12b is provided with a first angle sensor 14. The first angle sensor 14 detects a pinion angle θp which is a mechanical angle of the pinion shaft 12b. The first angle sensor 14 can be configured using, for example, an absolute angle sensor, a relative angle sensor, a resolver, or the like. Incidentally, when the first angle sensor 14 is configured using the relative angle sensor, the resolver, or the like, it is necessary to obtain the pinion angle θp by converting a relative angle into an absolute angle in the subsequent stage.

The steering shaft 12a is provided with a second angle sensor 15. The second angle sensor 15 detects a steering angle θs which is a mechanical angle of the steering shaft 12a. The second angle sensor 15 can be configured using, for example, an absolute angle sensor, a relative angle sensor, a resolver, or the like. Incidentally, when the second angle sensor 15 is configured using the relative angle sensor, the resolver, or the like, it is necessary to obtain the steering angle θs by converting a relative angle into an absolute angle in the subsequent stage.

In addition, the steering shaft 12a is provided with a torque sensor 13. The torque sensor 13 detects a steering torque Ts applied to the steering shaft 12a.

As illustrated in FIG. 1, the vehicle steering control device 3 according to the embodiment is configured to include an electric power steering (EPS) device 20 and a differential device 30. In the present embodiment, the vehicle steering control device 3 has a first steering assist mode of assisting a driver's steering at the time of normal steering of a vehicle 1 and a second steering assist mode of performing automatic steering independently from the driver's steering at the time of emergency avoidance steering or the like to avoid a collision between the vehicle 1 and an obstacle, for example, as operation modes. The vehicle steering control device 3 switches from the first steering assist mode to the second steering assist mode as a target pinion angle θp* is input from an automatic steering control unit (host control unit) 50. Incidentally, the vehicle steering control device 3 may be configured such that a signal for switching between the first steering assist mode and the second steering assist mode is input from the automatic steering control unit (host control unit) 50 other than the target pinion angle θp*. In addition, the automatic steering control unit (host control unit) 50 can seamlessly switch between the first steering assist mode and the second steering assist mode based on information from various sensors, for example, an obstacle detection sensor (not illustrated) or the like. For example, the second steering assist mode is turned on when the obstacle sensor has detected an obstacle in a traveling direction of the vehicle 1.

In the example illustrated in FIG. 1, the EPS device 20 is a so-called rack assist type electric power steering device that applies an assist force to the rack 18b. The EPS device 20 is configured to include a speed reduction mechanism 21, an EPS motor 22, and an EPS control unit 23. The speed reduction mechanism 21 and the EPS motor 22 constitute an EPS actuator 200. Incidentally, the present invention is not limited by the configuration of the speed reduction mechanism 21 and the configuration of the EPS motor 22.

An EPS controller 24 (first controller) for controlling the speed reduction mechanism 21 is incorporated in the EPS control unit 23. In the first steering assist mode, the EPS controller 24 performs current control to apply a desired assist torque to the steerable shaft 12, thereby applying an EPS motor current Im to the EPS motor 22. In addition, the EPS control unit 23 performs current control based on the target pinion angle θp* from the host control unit 50 and the steering torque Ts detected by the torque sensor 13 in the second steering assist mode, thereby applying the EPS motor current Im to the EPS motor 22. At this time, an angular displacement (hereinafter referred to as "EPS actuator angle") θeps in accordance with an angular acceleration of the EPS motor 22 is generated on the pinion shaft 12b.

The differential device 30 is configured to include a differential mechanism 31, a differential mechanism motor 32, and a differential mechanism control unit 33. The differential mechanism 31 and the differential mechanism motor 32 constitute a differential mechanism actuator 300. The differential mechanism 31 may be, for example, variable gear ratio steering (VGRS), or may be configured to have a structure such as a torque limiter and an electromagnetic clutch. The present invention is not limited by the configurations of the differential mechanism 31 and the differential mechanism motor 32.

A differential mechanism controller 34 (second controller) is incorporated in the differential mechanism control unit 33. As the differential mechanism controller 34 performs current control of the differential mechanism motor 32, an angular difference (hereinafter referred to as a "differential mechanism actuator angle") θdm is generated by the differential mechanism 31 provided between the pinion shaft 12b and the steering shaft 12a. The differential mechanism controller 34 will be described later.

Figure 2:
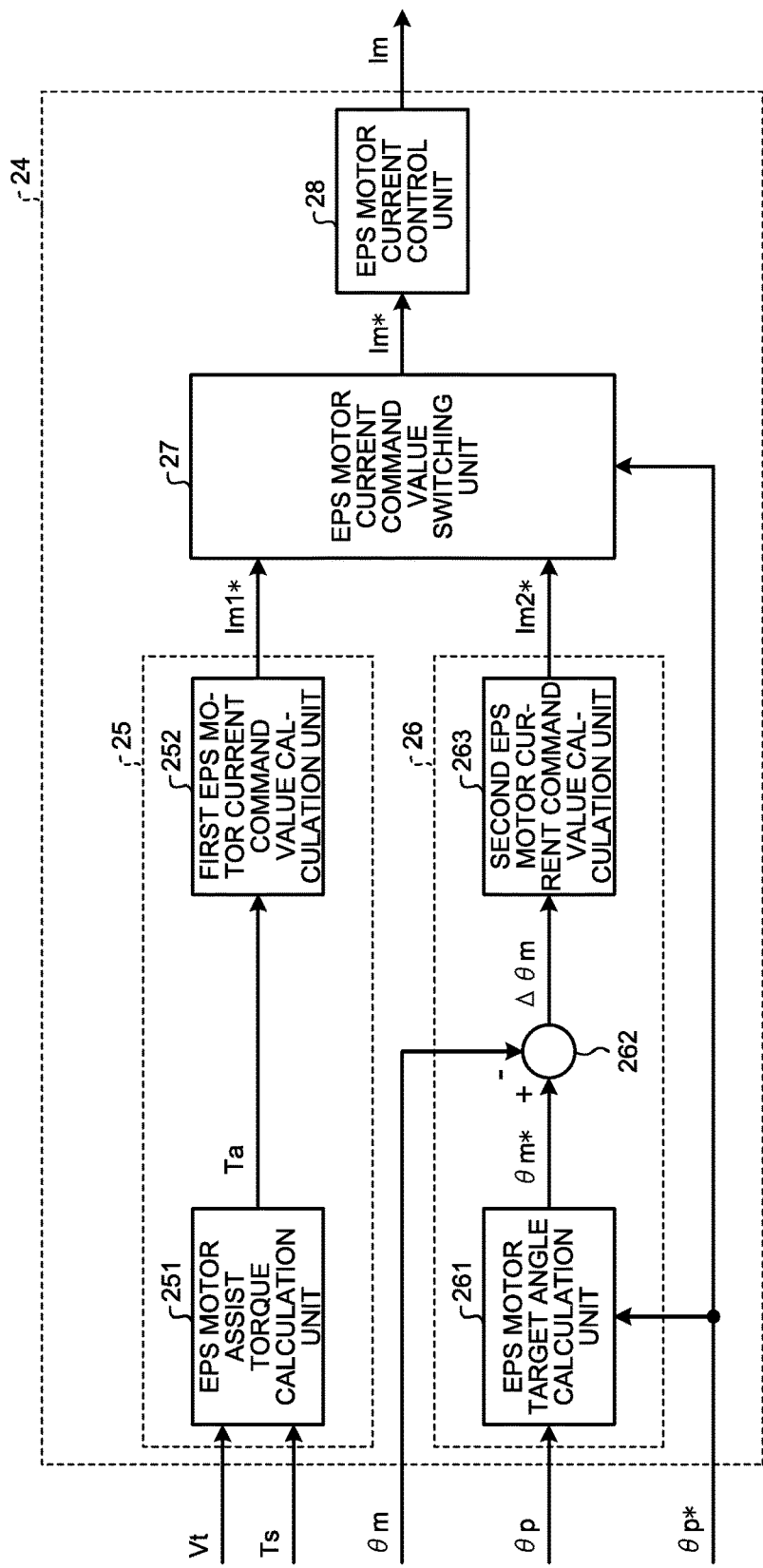
FIG. 2 is a diagram illustrating an example of an internal functional configuration of an EPS controller of the vehicle steering control device according to the first embodiment.

FIG. 2 is a diagram illustrating an example of an internal functional configuration of the EPS controller of the vehicle steering control device according to the first embodiment.

The EPS controller 24 is configured to include an EPS assist control unit 25, an EPS motor angle control unit 26, an EPS motor current command value switching unit 27, and an EPS motor current control unit 28. A vehicle speed Vt detected by a vehicle speed sensor 16, the pinion angle θp detected by the first angle sensor 14, the steering torque Ts detected by the torque sensor 13, an EPS motor angle θm from the EPS motor 22, and the target pinion angle θp* from the automatic steering control unit (host control unit) 50 are input to the EPS controller 24.

The EPS assist control unit 25 includes an EPS motor assist torque calculation unit 251 and a first EPS motor current command value calculation unit 252.

In the first steering assist mode, the EPS motor assist torque calculation unit 251 obtains the assist torque Ta as the EPS actuator 200 based on the vehicle speed Vt and the steering torque Ts, and outputs the obtained assist torque Ta to the first EPS motor current command value calculation unit 252.

The first EPS motor current command value calculation unit 252 obtains a current command value (first EPS motor current command value) Im1* of the EPS motor 22, necessary to obtain the assist torque Ta, and outputs the obtained current command value Im1* to the EPS motor current command value switching unit 27.

The EPS motor angle control unit 26 includes an EPS motor target angle calculation unit 261, an adder 262, and a second EPS motor current command value calculation unit 263.

In the second steering assist mode, the EPS motor target angle calculation unit 261 obtains an EPS motor target angle θm*, necessary in the second steering assist mode, based on the target pinion angle θp* and the pinion angle θp. More specifically, the EPS motor target angle calculation unit 261 obtains an angular deviation of the pinion angle θp with respect to the target pinion angle θp* and obtains an EPS actuator target angle θeps* necessary to offset the angular deviation. Further, the EPS motor target angle calculation unit 261 obtains the EPS motor target angle θm corresponding to the obtained EPS actuator target angle θeps*, and outputs the obtained EPS motor target angle θm* to the adder 262.

The adder 262 obtains an angular deviation Δθm between the EPS motor target angle θm* and the EPS motor angle θm and outputs the obtained angular deviation Δθm to the second EPS motor current command value calculation unit 263.

The second EPS motor current command value calculation unit 263 obtains a current command value (second EPS motor current command value) Im2* of the EPS motor 22, necessary to offset the angular deviation Δθm between the EPS motor target angle θm and the EPS motor angle θm, and outputs the obtained current command value Im2* to the EPS motor current command value switching unit 27.

In accordance with the target pinion angle θp*, the EPS motor current command value switching unit 27 outputs the first EPS motor current command value Im1* output from the EPS assist control unit 25 and the second EPS motor current command value Im2* output from the EPS motor angle control unit 26 in a switching manner as an EPS motor current command value Im*. More specifically, when the target pinion angle θp* has not been input from the automatic steering control unit (host control unit) 50, the EPS motor current command value switching unit 27 outputs the first EPS motor current command value Im1* to the EPS motor current control unit 28 as the EPS motor current command value Im* assuming that the operation mode is the first steering assist mode. In addition, when the target pinion angle θp* has been input from the automatic steering control unit (host control unit) 50, the EPS motor current command value switching unit 27 outputs the second EPS motor current command value Im2* to the EPS motor current control unit 28 as the EPS motor current command value Im* assuming that the operation mode is the second steering assist mode.

The EPS motor current control unit 28 generates the EPS motor current Im in accordance with the EPS motor current command value Im* output from the EPS motor current command value switching unit 27 and applies the generated EPS motor current Im to the EPS motor 22.

That is, the EPS controller 24 performs the current control of the EPS motor 22 so as to obtain the assist torque Ta in accordance with the steering torque Ts at the vehicle speed Vt in the first steering assist mode, thereby performing torque control of the EPS actuator 200. In addition, the EPS controller 24 performs the current control of the EPS motor 22 so as to follow the target pinion angle θp* input from the automatic steering control unit (host control unit) 50 in the second steering assist mode, thereby performing angle control of the EPS actuator 200.

Figure 3:
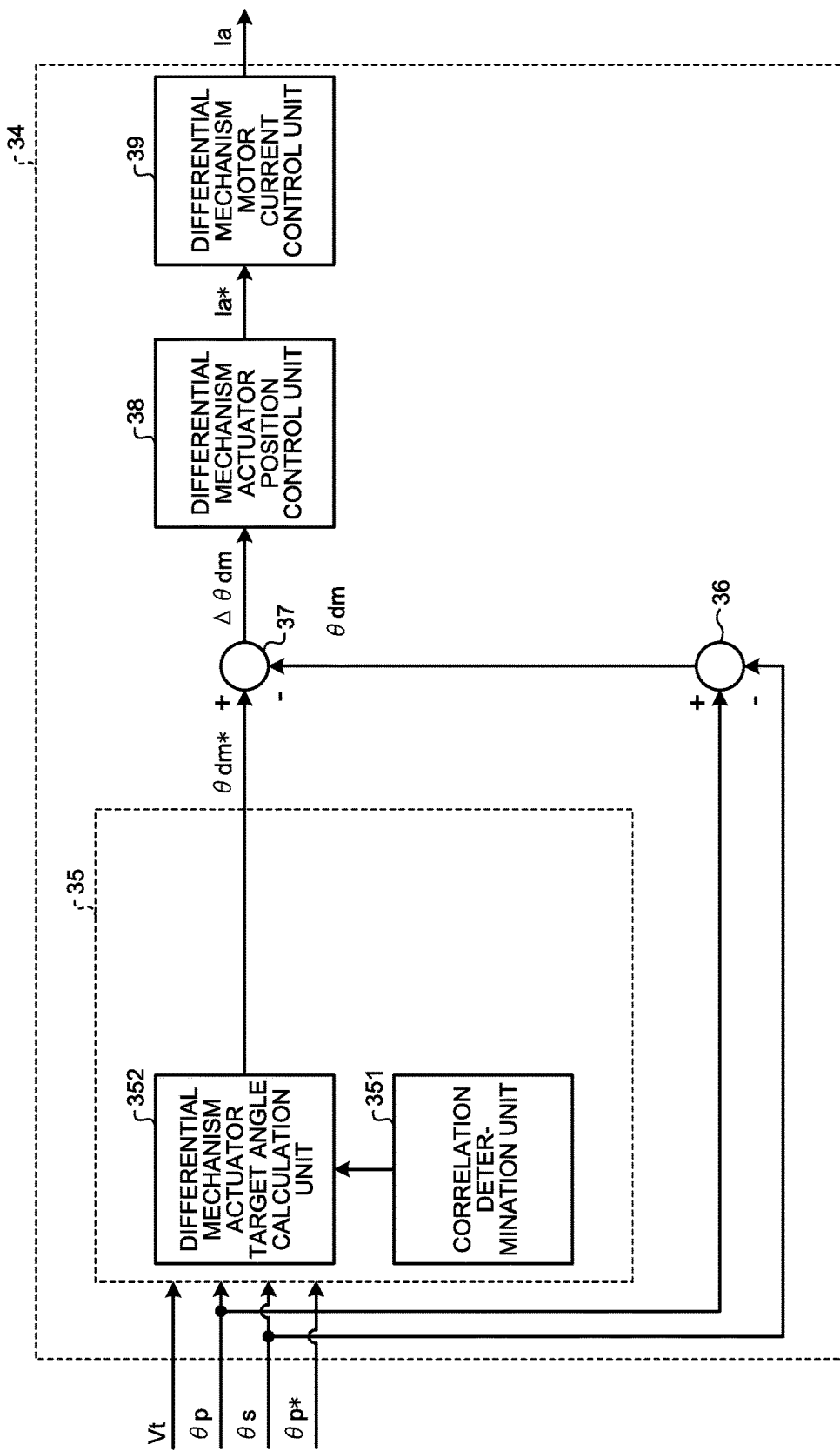
FIG. 3 is a diagram illustrating an example of an internal functional configuration of a differential mechanism controller of the vehicle steering control device according to the first embodiment.

FIG. 3 is a diagram illustrating an example of an internal functional configuration of the differential mechanism controller of the vehicle steering control device according to the first embodiment.

The differential mechanism controller 34 is configured to include a differential mechanism actuator command value generation unit 35, adders 36 and 37, a differential mechanism actuator position control unit 38, and a differential mechanism motor current control unit 39.

The differential mechanism actuator command value generation unit 35 is configured to include a correlation determination unit 351 and a differential mechanism actuator target angle calculation unit 352. The pinion angle θp detected by the first angle sensor 14, the steering angle θs detected by the second angle sensor 15, the vehicle speed Vt detected by the vehicle speed sensor 16, and the target pinion angle θp* from the automatic steering control unit (host control unit) 50 are input to the differential mechanism actuator command value generation unit 35.

The differential mechanism controller 34 according to the present embodiment implements steering angle displacement suppression control to suppress the angular displacement generated in the steering angle θs by controlling the angle of the differential mechanism actuator 300 in the second steering assist mode, and implements phase shift suppression control to suppress a relative shift of the phase of the steering angle θs with respect to the phase of the pinion angle θp caused by the steering angle displacement suppression control in the first steering assist mode.

The correlation determination unit 351 determines whether a correlation between the pinion angle θp and the steering angle θs satisfies a predetermined reference correlation in the first steering assist mode, that is, when the target pinion angle θp* has not been input from the automatic steering control unit (host control unit) 50. The correlation between the pinion angle θp and the steering angle θs and the reference correlation will be described later.

When the correlation determination unit 351 has determined that the pinion angle θp and the steering angle θs do not satisfy the predetermined correlation in the first steering assist mode, the differential mechanism actuator target angle calculation unit 352 obtains an angle command in the differential mechanism actuator 300, that is, a differential mechanism actuator target angle θdm* in the differential mechanism actuator target angle calculation unit 352 based on the vehicle speed Vt, the pinion angle θp, and the steering angle θs, and outputs the obtained angle command to the adder 37.

In addition, the differential mechanism actuator target angle calculation unit 352 obtains the differential mechanism actuator target angle θdm* in the differential mechanism actuator 300 based on the steering angle θs in the second steering assist mode, and outputs the obtained differential mechanism actuator target angle θdm* to the adder 37.

The adder 36 obtains a relative difference between the pinion angle θp and the steering angle θs and outputs the obtained relative difference to the adder 37. The relative difference between the pinion angle θp and the steering angle θs is a differential mechanism actuator angle θdm in the differential mechanism actuator 300.

The adder 37 obtains an angular deviation Δθdm between the differential mechanism actuator target angle θdm* output from the differential mechanism actuator target angle calculation unit 352 and the differential mechanism actuator angle θdm output from the adder 36, and outputs the obtained angular deviation Δθdm to the differential mechanism actuator position control unit 38.

The differential mechanism actuator position control unit 38 controls a position of the differential mechanism actuator 300 based on the angular deviation Δθdm between the differential mechanism actuator target angle θdm* and the differential mechanism actuator angle θdm. That is, the differential mechanism actuator position control unit 38 obtains a current command value (differential mechanism motor current command value) Ia* of the differential mechanism motor 32, necessary to offset the angular deviation Δθdm between the differential mechanism actuator target angle θdm* and the differential mechanism actuator angle θdm, and outputs the obtained current command value Ia* to the differential mechanism motor current control unit 39.

The differential mechanism motor current control unit 39 generates a differential mechanism motor current Ia in accordance with the differential mechanism motor current command value Ia* output from the differential mechanism actuator position control unit 38 and applies the generated differential mechanism motor current Ia to the differential mechanism motor 32.

Here, a concept of the steering angle displacement suppression control of the differential mechanism controller 34 will be described.

Figure 4:
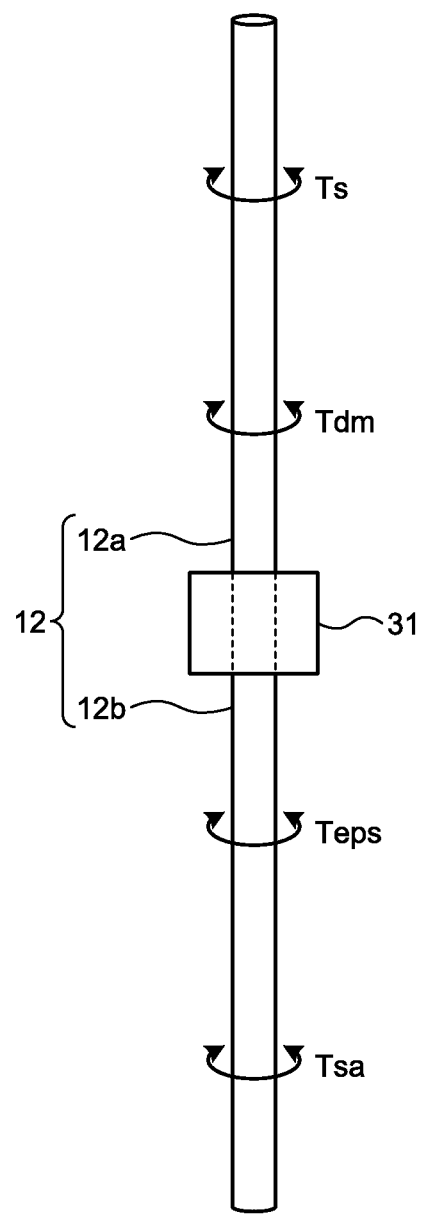
FIG. 4 is a view illustrating an example of a torque acting on a steerable shaft in a second steering assist mode of the vehicle steering control device according to the first embodiment.

FIG. 4 is a view illustrating an example of a torque acting on the steerable shaft in the second steering assist mode of the vehicle steering control device according to the first embodiment. As illustrated in FIG. 4, each torque, such as a steering torque Ts, a differential mechanism actuator torque Tdm generated by the differential mechanism actuator 300, an EPS actuator torque Teps obtained by converting an acceleration proportional to inertia applied from the EPS device 20 whose angle is controlled in the second steering assist mode, and a self-aligning torque Tsa acting on the vehicle 1 during traveling, acts on the steerable shaft 12.

The steering torque Ts, the differential mechanism actuator torque Tdm, the EPS actuator torque Teps, and the self-aligning torque Tsa are expressed by the following Formula (1).

$$Ts+Tdm=Teps+Tsa \qquad (1)$$

When the above Formula (1) is transformed as an expression of the steering torque Ts, the following Formula (2) is obtained.

$$Ts=(Teps+Tsa)-Tdm \qquad (2)$$

As is apparent from the above Formula (2), a torque (Teps+Tsa) obtained by adding the EPS actuator torque Teps and the self-aligning torque Tsa generated by the EPS device 20 in the second steering assist mode is offset by the differential mechanism actuator torque Tdm that can be generated by the differential mechanism actuator 300, so that the torque to be transmitted to the driver can be suppressed.

In addition, an angular displacement θh, caused by the respective torques including the steering torque Ts occurring on the steerable shaft 12, the differential mechanism actuator torque Tdm, the EPS actuator torque Teps, and the self-aligning torque Tsa, is generated in the steering wheel 11. At this time, an equation of motion around the steering wheel 11 is given by the following Formula (3).

$$Ts+Tdm-(Teps+Tsa)=Jh \times d2\theta h/dt \qquad (3)$$

When the above Formula (3) is transformed as an expression of the angular displacement θh, the following Formula (4) is obtained.

$$\theta h=\iint\{Ts+Tdm-(Teps+Tsa)\}/Jh \qquad (4)$$

As is apparent from the above Formula (4), the angular displacement θh, caused by the respective torques including the steering torque Ts occurring on the steerable shaft 12, the differential mechanism actuator torque Tdm, the EPS actuator torque Teps, and the self-aligning torque Tsa, is generated in the steering wheel 11. In addition, when the angular displacement θh in the above Formula (4) is replaced with the steering angle θs, the steering angle θs can be suppressed by offsetting the torque (Teps+Tsa) obtained by adding the EPS actuator torque Teps and the self-aligning torque Tsa generated by the EPS device 20 in the second steering assist mode with the differential mechanism actuator torque Tdm that can be generated by the differential mechanism actuator 300. In other words, it is possible to suppress the steering angle θs in the second steering assist mode using the differential mechanism actuator torque Tdm.

Here, the relationship between the pinion angle θp and the steering angle θs in the first steering assist mode can be expressed by the following Formula (5).

$$\theta p=\alpha\theta s \qquad (5)$$

In the above Formula (5), α is a ratio of the pinion angle θp relative to the steering angle θs. The ratio α of the pinion angle θp relative to the steering angle θs can be set to an arbitrary value larger than zero.

Figure 5:
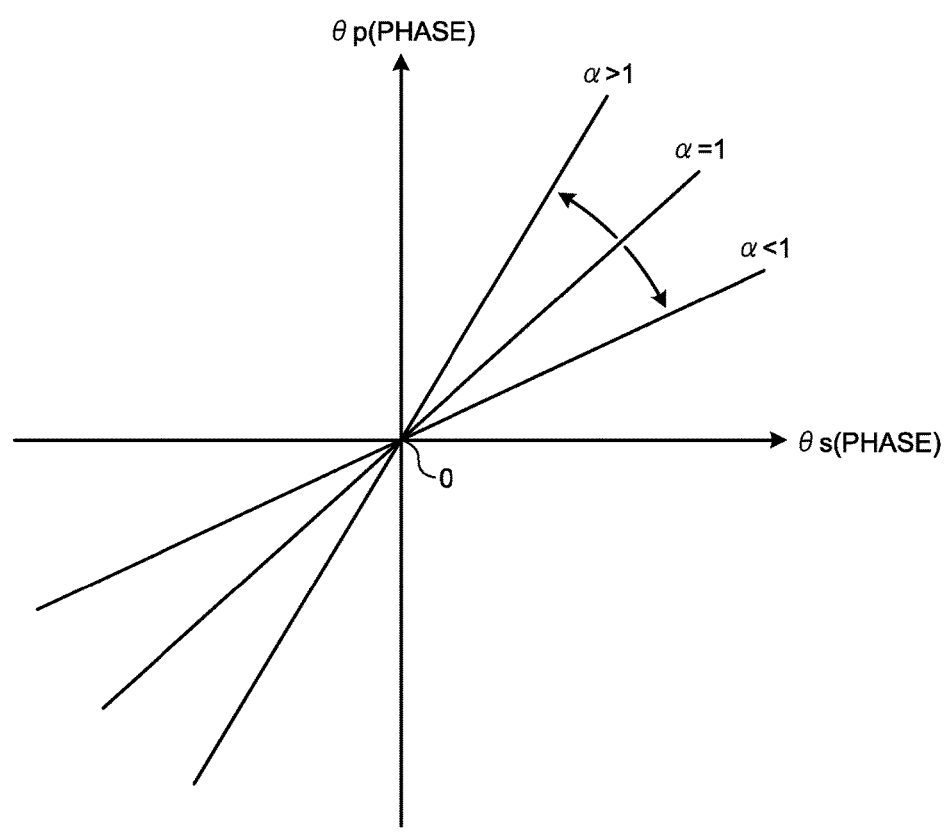
FIG. 5 is a graph illustrating a relationship between a pinion angle $\theta p$ and a steering angle $\theta s$ at a vehicle speed Vt in the vehicle steering control device according to the first embodiment.

FIG. 5 is a graph illustrating the relationship between the pinion angle θp and the steering angle θs at the vehicle speed Vt. In the example illustrated in FIG. 5, the horizontal axis represents the phase of the steering angle θs, and the vertical axis represents the phase of the pinion angle θp. In addition, the right direction represents a rightward turning direction of the steering wheel 11 and the left direction represents a leftward turning direction of the steering wheel 11 in the example illustrated in FIG. 5. In the example illustrated in FIG. 5, the upward direction represents a rightward steered direction of the drive wheels 2FL and 2FR, and the downward direction represents a leftward steered direction of the drive wheels 2FL and 2FR.

In the example illustrated in FIG. 5, an example in which the correlation between the pinion angle θp and the steering angle θs at the arbitrary vehicle speed Vt is expressed by a primary straight line which passes through the origin (θp=0, θs=0) and in which the pinion angle θp and the steering angle θs have a proportional relationship with a positive inclination is illustrated. Incidentally, the example of the primary straight line in which the pinion angle θp and the steering angle θs have the proportional relationship with the positive inclination is illustrated in the example illustrated in FIG. 5, but it may be configured as a cubic curve that always has an inclination from zero to a positive value.

As illustrated in FIG. 5, it is possible to obtain a large pinion angle θp with a small steering angle θs if the ratio α of the pinion angle θp relative to the steering angle θs is increased (α=1→α>1), and a larger steering angle θs is required to obtain a large pinion angle θp if the ratio α of the pinion angle θp relative to the steering angle θs is decreased (α=1→α<1). In general, the former is suitable for low-speed traveling, and the latter is suitable for high-speed traveling. That is, it is desirable to change the ratio α of the pinion angle θp relative to the steering angle θs in accordance with the vehicle speed Vt in the first steering assist mode.

In the vehicle steering control device 3 according to the present embodiment, the differential mechanism actuator angle θdm in the differential mechanism actuator 300 is superimposed. At this time, when assuming that a ratio between the steering angle θs and the pinion angle θp determined by the differential mechanism 31 is β and a ratio between the steering angle θs and the differential mechanism actuator angle θdm determined by the differential mechanism 31 is γ, the following Formula (6) is obtained.

$$\theta p=\beta\theta s+\gamma\theta dm \qquad (6)$$

Here, the ratio β between the steering angle θs and the pinion angle θp and the ratio γ between the steering angle θs and the differential mechanism actuator angle θdm are constant values determined by the differential mechanism 31.

When the pinion angle θp is eliminated from the above Formulas (5) and (6), and the resultant is transformed as an expression of the differential mechanism actuator angle θdm, the following Formula (7) is obtained.

$$\theta dm = (\alpha - \beta) \times \theta s / \gamma \qquad (7)$$

The right side in the above Formula (7) is the angle command for the differential mechanism actuator 300 in the second steering assist mode of the present embodiment, that is, the differential mechanism actuator target angle θdm* in the differential mechanism actuator target angle calculation unit 352. As the differential mechanism actuator 300 is controlled such that the above Formula (7) is satisfied, the above Formulas (5) and (6) are established.

In the first steering assist mode, the steering shaft 12a serves as an input shaft of the differential mechanism 31, and the pinion shaft 12b serves as an output shaft of the differential mechanism 31. That is, the steering angle θs is input to the differential mechanism 31, and the pinion angle θp is output therefrom.

On the other hand, the angular displacement is generated in the pinion shaft 12b by angle control of the EPS actuator 200 in the second steering assist mode. At this time, the EPS actuator torque Teps obtained by the conversion of the acceleration proportional to the inertia is generated as described above, and the EPS actuator torque Teps is transmitted to the steering wheel 11 via the pinion shaft 12b, the differential mechanism 31, and the steering shaft 12a. When the EPS actuator torque Teps is larger than the steering torque Ts, angular displacement corresponding to a torque difference between the EPS actuator torque Teps and the steering torque Ts is generated in the steering wheel 11. That is, the pinion shaft 12b may serve as the input shaft of the differential mechanism 31, and the steering shaft 12a may serve as the output shaft of the differential mechanism 31 in the second steering assist mode. At this time, the pinion angle θp is input to the differential mechanism 31, and the steering angle θs is output therefrom. Therefore, when the above Formulas (5) and (6) are transformed as expressions of the steering angle θs, the following Formulas (8) and (9) are obtained.

$$\theta s = \theta p / \alpha \qquad (8)$$

$$\theta s = (\theta p - \gamma \theta dm) / \beta \qquad (9)$$

As is apparent from the above Formula (8), the steering angle θs is a value obtained by multiplying the pinion angle θp by a reciprocal of the ratio α of the pinion angle θp relative to the steering angle θs, that is, 1/α which is a ratio of the steering angle θs relative to the pinion angle θp. Therefore, it is possible to implement the steering angle displacement suppression control in which the angular displacement (steering angle displacement) generated in the steering wheel 11 is suppressed if the ratio 1/α of the steering angle θs relative to the pinion angle θp is decreased, that is, the ratio α of the pinion angle θp relative to the steering angle θs is increased in the second steering assist mode.

Therefore, in the second steering assist mode of the vehicle steering control device 3 according to the present embodiment, the differential mechanism actuator target angle calculation unit 352 obtains the differential mechanism actuator target angle θdm* by applying the ratio α of the pinion angle θp relative to the steering angle θs such that the angular displacement of the steering angle θs is smaller than the angular displacement of the pinion angle θp to the above Formula (7).

That is, the angle of the differential mechanism actuator 300 is controlled using the ratio α of the pinion angle θp relative to the steering angle θs such that the angular displacement of the steering angle θs is smaller than the angular displacement of the pinion angle θp in the second steering assist mode. As a result, it is possible to implement the steering angle displacement suppression control to make the angular displacement of the steering angle θs smaller than the angular displacement of the target pinion angle θp* in the second steering assist mode.

At this time, the differential mechanism actuator 300 obtains the differential mechanism actuator angle θdm in a direction to cancel the EPS actuator torque Teps applied by the EPS device 20 in the second steering assist mode, that is, in a direction opposite to the EPS actuator torque Teps such that the pinion angle θp applied to the steerable shaft 12 by the EPS actuator torque Teps is canceled. Accordingly, the differential mechanism actuator angle θdm in a direction opposite to the pinion angle θp generated by the EPS actuator torque Teps is generated, and as a result, the angular displacement of the steering angle θs is suppressed, and it is possible to suppress the influence of the torque (EPS actuator torque Teps) generated in the second steering assist mode by the EPS device 20 on the steering of the steering wheel 11 performed by the driver.

Next, a concept of the phase shift suppression control of the differential mechanism controller 34 will be described.

Figure 6:
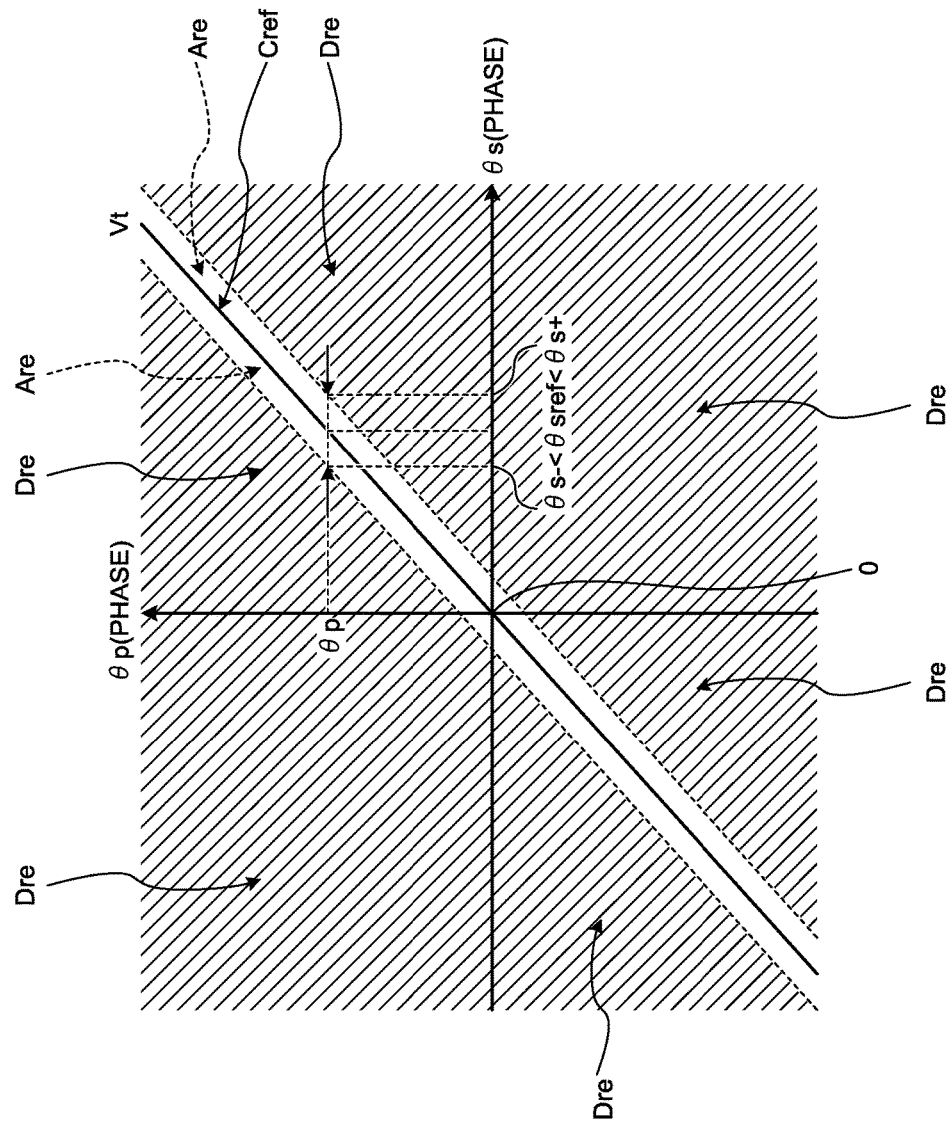
FIG. 6 is a graph illustrating an example of a reference correlation, a correlation allowable region, and a correlation deviation region between the pinion angle $\theta p$ and the steering angle $\theta s$ at the vehicle speed Vt of the vehicle steering control device according to the first embodiment.

FIG. 6 is a graph illustrating an example of the reference correlation, a correlation allowable region, and a correlation deviation region between the pinion angle θp and the steering angle θs at the vehicle speed Vt of the vehicle steering control device according to the first embodiment.

In the example illustrated in FIG. 6, the horizontal axis represents the phase of the steering angle θs and the vertical axis represents the phase of the pinion angle θp. In addition, the right direction represents the rightward turning direction of the steering wheel 11 and the left direction represents the leftward turning direction of the steering wheel 11 in the example illustrated in FIG. 6. In the example illustrated in FIG. 6, the upward direction represents the rightward steered direction of the drive wheels 2FL and 2FR, and the downward direction represents the leftward steered direction of the drive wheels 2FL and 2FR.

In the example illustrated in FIG. 6, a reference correlation Cref between the phase of the pinion angle θp at the arbitrary vehicle speed Vt and the phase of the steering angle θs is indicated by a solid line. In addition, a steering angle lower limit value θs−, which is smaller than a phase (reference phase) of a reference steering angle θsref on the reference correlation Cref, and a steering angle upper limit value θs+, which is larger than the phase (reference phase) of the reference steering angle θsref on the reference correlation Cref, are provided with respect to the steering angle θs in the present embodiment (θs−<θsref<θs+). Hereinafter, a region Are satisfying that "θs−<θsref<θs+" will be referred to as the "correlation allowable region". In addition, a region Dre outside the correlation allowable range will be referred to as the "correlation deviation region". Incidentally, the reference correlation Cref, the correlation allowable region Are, and the correlation deviation region Dre may be changed in accordance with the vehicle speed Vt.

In the present embodiment, the steering angle displacement suppression control to perform the angle control of the differential mechanism actuator 300 is implemented such that the angular displacement of the steering angle θs is smaller than the angular displacement of the pinion angle θp in the second steering assist mode as described above. There is a case where the phase of the steering angle θs deviates from the correlation allowable region Are as a relative shift of the phase of the steering angle θs with respect to the phase (reference phase) of the reference steering angle θsref corresponding to the phase of the pinion angle θp is caused by the steering angle displacement suppression control. At the time of transition from the second steering assist mode to the first steering assist mode in the state where the phase of the steering angle θs deviates from the correlation allowable region Are, a mismatch occurs between the steering angle of the steering wheel 11 and a steered angle of the drive wheels 2FL and 2FR. Hereinafter, a description will be given regarding an example in which the relative shift of the phase of the steering angle θs with respect to the phase of the reference steering angle θsref corresponding to the phase of the pinion angle θp is generated by the steering angle displacement suppression control in the second steering assist mode and the mismatch occurs between the steering angle of the steering wheel 11 and the steered angle of the drive wheels 2FL and 2FR at the time of transition to the first steering assist mode with reference to FIG. 7.

Figure 7:
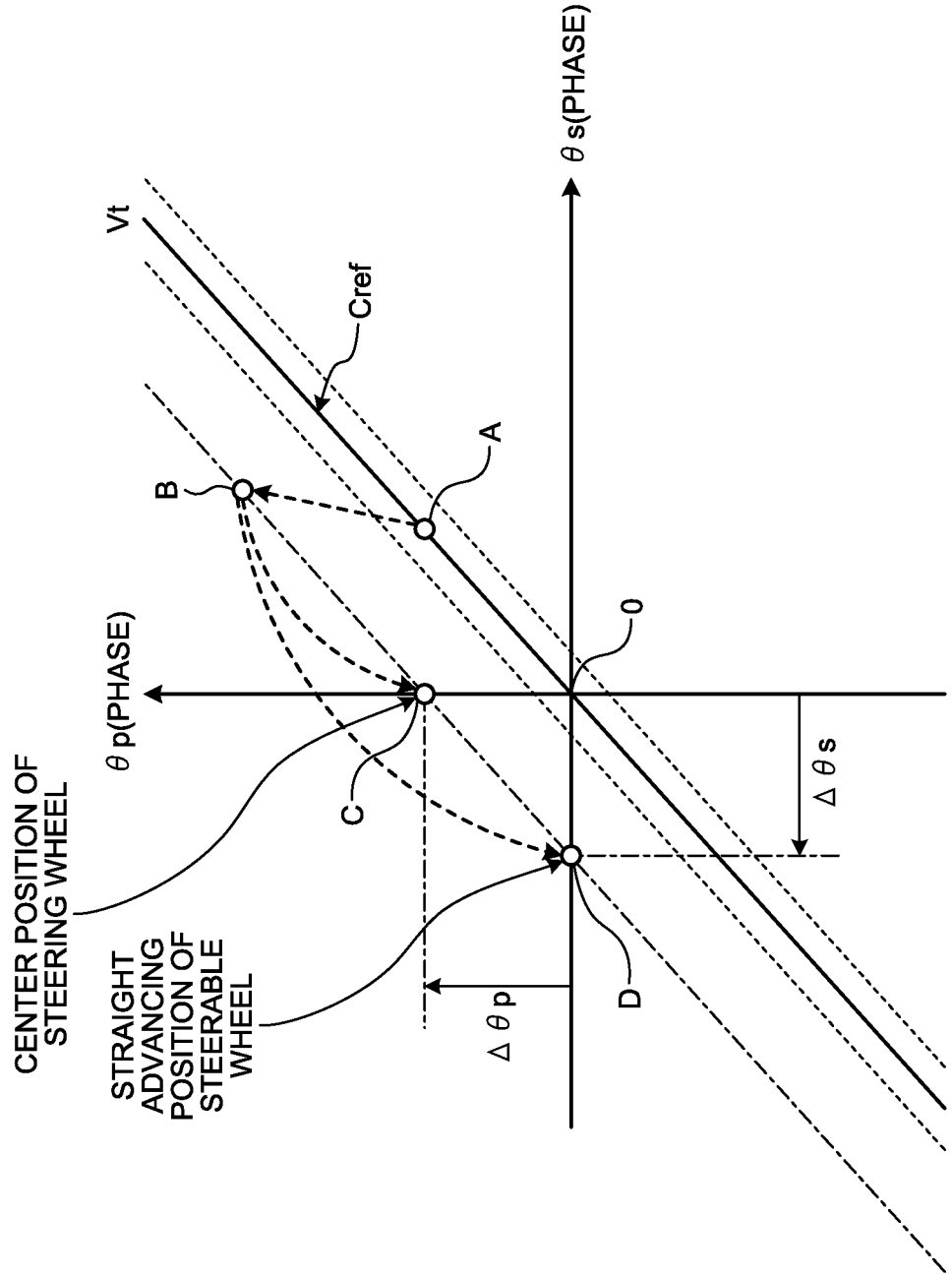
FIG. 7 is a graph illustrating an example of a state where a phase of the steering angle $\theta s$ is shifted with respect to a phase of the pinion angle $\theta p$ at the time of transition from the second steering assist mode to a first steering assist mode.

FIG. 7 is a graph illustrating an example of a state where the phase of the steering angle θs is shifted with respect to the phase of the reference steering angle θsref corresponding to the phase of the pinion angle θp at the time of transition from the second steering assist mode to the first steering assist mode.

In the example illustrated in FIG. 7, A indicates a correlation between the pinion angle θp and the steering angle θs in the first steering assist mode before transitioning to the second steering assist mode, B indicates a correlation between the pinion angle θp and the steering angle θs when the relative shift of the steering angle θs with respect to the phase of the reference steering angle θsref corresponding to the phase of the pinion angle θp is generated by the steering angle displacement suppression control in the second steering assist mode, C indicates a correlation between the pinion angle θp and the steering angle θs when the steering wheel 11 is set at a center position (the phase of the steering angle is "0") in the state where the relative shift of the steering angle θs is generated with respect to the phase of the reference steering angle θsref corresponding to the phase of the pinion angle θp, and D indicates a correlation between the pinion angle θp and the steering angle θs when the drive wheels 2FL and 2FR are set at a straight advancing position (the phase of the pinion angle is "0") in the state where the relative shift of the steering angle θs is generated with respect to the phase of the reference steering angle θsref corresponding to the phase of the pinion angle θp.

In the example illustrated in FIG. 7, an example in which the correlation between the pinion angle θp and the steering angle θs deviates from the correlation allowable region Are to become B in the correlation deviation region Dre as the target pinion angle θp* is input from the automatic steering control unit (host control unit) 50 so that the operation mode transitions to the second steering assist mode and the steering angle displacement suppression control is executed when the correlation between the pinion angle θp and the steering angle θs is A in the correlation allowable region Are in the first steering assist mode is illustrated. When the operation mode transitions to the first steering assist mode in such a state and the driver steers the steering wheel 11 to bring the steering wheel 11 at the center position, the phase of the pinion angle θp is shifted by Δθp, and a state where an offset angle of Δθp is added to the steered angle of the drive wheels 2FL and 2FR is obtained. At this time, the vehicle 1 does not advance straight but advances curving in the right direction by an angle corresponding to Δθp in the example illustrated in FIG. 7. In addition, if the steered angle of the drive wheels 2FL and 2FR is set to the straight advancing position so as to make the vehicle 1 advance straight, the phase of the steering angle θs is shifted by Δθs, and a state where an offset angle of Δθs is added to the steering wheel 11 is obtained. At this time, a state where the steering wheel 11 is cut in the left direction by Δθs is obtained in the example illustrated in FIG. 7.

Thus, the relative shift of the phase of the steering angle θs with respect to the phase of the reference steering angle θsref corresponding to the phase of the pinion angle θp on the reference correlation Cref is suppressed in the phase shift suppression control in the vehicle steering control device 3 according to the present embodiment. In other words, the phase of the steering angle θs is controlled such that the correlation between the pinion angle θp and the steering angle θs satisfies the predetermined correlation.

Figure 8:
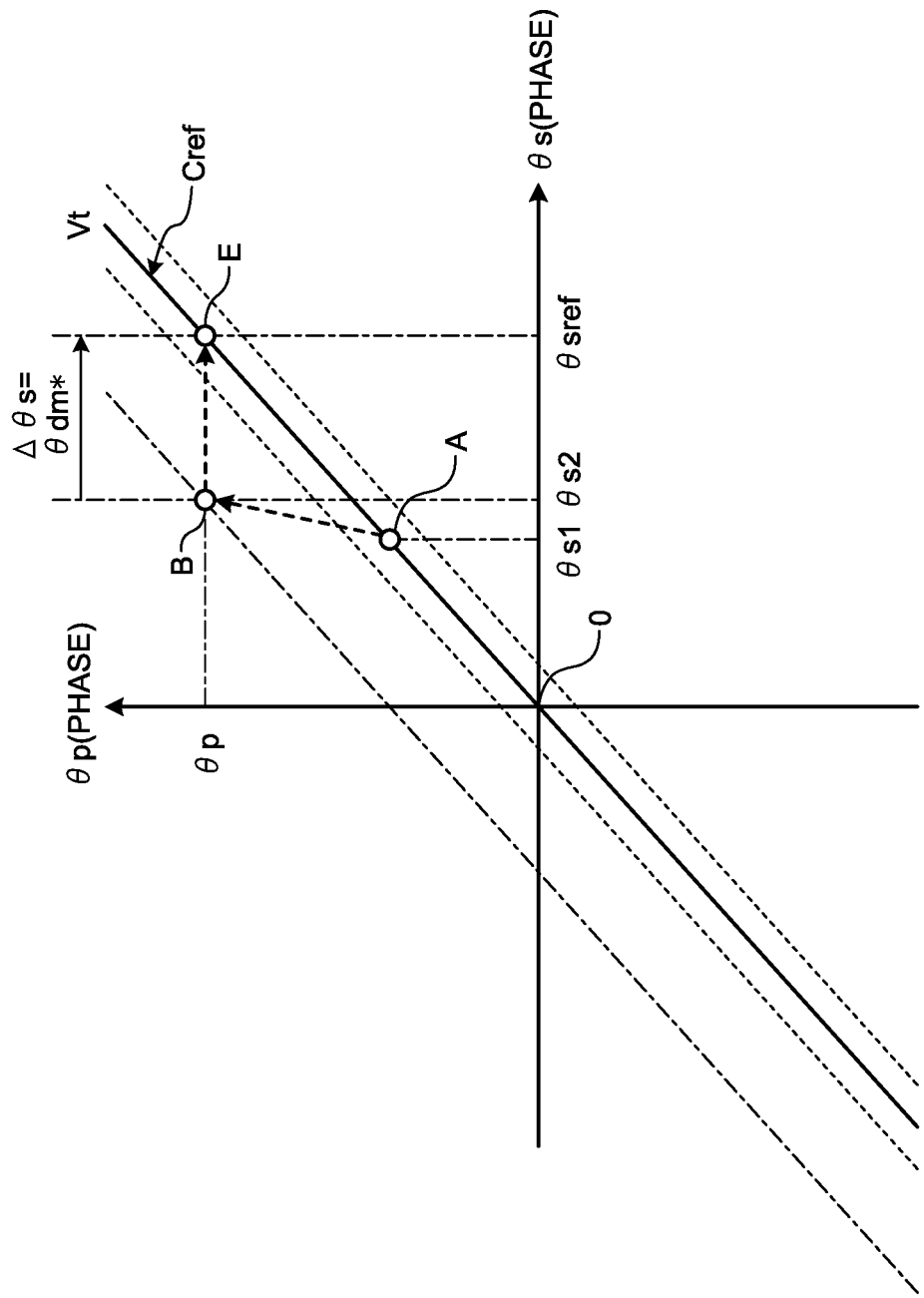
FIG. 8 is a graph illustrating an operation example of phase shift suppression control in the vehicle steering control device according to the first embodiment.

FIG. 8 is a graph illustrating an operation example of the phase shift suppression control in the vehicle steering control device according to the first embodiment.

In the example illustrated in FIG. 8, an example in which the correlation between the pinion angle θp and the steering angle θs deviates from the correlation allowable region Are to become B (steering angle θs2) in the correlation deviation region Dre as the target pinion angle θp* is input from the automatic steering control unit (host control unit) 50 so that the operation mode transitions to the second steering assist mode and the steering angle displacement suppression control is executed when the correlation between the pinion angle θp and the steering angle θs is A (steering angle θs1) in the correlation allowable region Are in the first steering assist mode is illustrated, which is similar to the example illustrated in FIG. 7. At this time, the phase shift suppression control is performed such that the correlation between the pinion angle θp and the steering angle θs becomes E (steering angle θsref) at the time of transition to the first steering assist mode in the vehicle steering control device 3 according to the present embodiment. As a result, even when the correlation between the pinion angle θp and the steering angle θs deviates from the correlation allowable region Are by the steering angle displacement suppression control in the second steering assist mode, it is possible to perform the phase shift suppression control in the first steering assist mode such that the correlation between the pinion angle θp and the steering angle θs satisfies the predetermined correlation allowable region Are by the phase shift suppression control.

Hereinafter, a method of implementing the phase shift suppression control in the first steering assist mode will be described with reference to FIGS. 1, 3, 6, and 8.

As described above, the correlation determination unit 351 determines whether the pinion angle θp and the steering angle θs satisfy the predetermined correlation in the first steering assist mode, that is, when the target pinion angle θp* has not been input from the automatic steering control unit (host control unit) 50. More specifically, the correlation determination unit 351 determines whether the correlation between the pinion angle θp and the steering angle θs falls within the correlation allowable region Are (for example, θs−<θsref<θs+ illustrated in FIG. 6) at the arbitrary vehicle speed Vt, and outputs a result of the determination to the differential mechanism actuator target angle calculation unit 352. Incidentally, regarding the reference correlation Cref between the pinion angle θp and the steering angle θs at the arbitrary vehicle speed Vt and the correlation allowable region Are, for example, it may be configured such that the correlation determination unit 351 has a table or an arithmetic expression that prescribes the reference correlation Cref for each arbitrary vehicle speed Vt and a table or an arithmetic expression that prescribes the correlation allowable region Are, or it may be configured such that the reference correlation Cref and the correlation allowable region Are prescribed by these tables and arithmetic expressions are stored in an external storage unit (not illustrated) and read out by the correlation determination unit 351. In addition, the correlation determination unit 351 may have a plurality of the reference correlations Cref and correlation allowable regions Are for each arbitrary vehicle speed Vt, and it may be configured such that the correlation determination unit 351 can read out the plurality of reference correlations Cref and correlation allowable regions Are from an external storage unit.

When the correlation determination unit 351 determines that the pinion angle θp and the steering angle θs do not satisfy the predetermined correlation, the differential mechanism actuator target angle calculation unit 352 calculates the differential mechanism actuator target angle θdm* based on the vehicle speed Vt, the pinion angle θp, and the steering angle θs. At this time, the differential mechanism actuator target angle calculation unit 352 obtains the differential mechanism actuator target angle θdm* based on the reference correlation Cref between the phase of the pinion angle θp and the phase of the steering angle θs at the arbitrary vehicle speed Vt. More specifically, the phase (reference phase) of the reference steering angle θsref on the reference correlation Cref corresponding to the phase of the pinion angle θp is set as a target phase in the phase shift suppression control, and a phase angle Δθs to the target phase is set as the differential mechanism actuator target angle θdm*. Incidentally, regarding the reference correlation Cref between the pinion angle θp and the steering angle θs at the arbitrary vehicle speed Vt, for example, it may be configured such that the differential mechanism actuator target angle calculation unit 352 has a table or an arithmetic expression that prescribes the reference correlation Cref for each arbitrary vehicle speed Vt, or it may be configured such that the reference correlation Cref prescribed by these tables and arithmetic expression is stored in an external storage unit (not illustrated) and read out by the differential mechanism actuator target angle calculation unit 352. In addition, the correlation determination unit 351 may have a plurality of the reference correlations Cref for each arbitrary vehicle speed Vt, and it may be configured such that the correlation determination unit 351 can read out the plurality of reference correlations Cref from an external storage unit.

In the vehicle steering control device 3 according to the present embodiment, the reference correlation Cref defining the phase (reference phase) of the reference steering angle θsref corresponding to the phase of the pinion angle θp at the arbitrary vehicle speed Vt and the correlation allowable region Are of the steering angle θs with respect to the phase (reference phase) of the reference steering angle θsref on the reference correlation Cref are prescribed, and the phase shift suppression control is performed to suppress the relative shift of the phase of the steering angle θs with respect to the phase (reference phase) of the reference steering angle θsref on the reference correlation Cref corresponding to the phase of the pinion angle θp at the time of transition from the second steering assist mode to the first steering assist mode. As a result, it is possible to alleviate discomfort caused by the mismatch between the steering angle of the steering wheel 11 and the steered angle of the drive wheels 2FL and 2FR generated by the steering angle displacement suppression control in the first steering assist mode.

As described above, the vehicle steering control device 3 according to the first embodiment includes: the EPS controller (first controller) 24 that controls the speed reduction mechanism 21 and the differential mechanism controller (second controller) 34 that controls the differential mechanism 31 in the steering mechanism 100 in which the steering wheel 11 and the rack-and-pinion 18 which steers and drives the drive wheels 2FL and 2FR are connected via the differential mechanism 31 and the speed reduction mechanism 21 is provided between the rack-and-pinion 18 and the drive wheels 2FL and 2FR.

In addition, the vehicle steering control device 3 according to the embodiment has the first steering assist mode of assisting the driver's steering and the second steering assist mode of performing the automatic steering independently from the driver's steering as the operation modes of the EPS controller (first controller) 24 and the differential mechanism controller (second controller) 34.

In the above configuration, the differential mechanism controller (second controller) 34 performs the phase shift suppression control to suppress the relative shift of the phase of the steering angle θs (phase on the steering wheel 11 side of the differential mechanism 31) with respect to the phase of the reference steering angle θsref (reference phase on the steering wheel 11 side of the differential mechanism 31) corresponding to the phase of the pinion angle θp (phase on the rack-and-pinion 18 side of the differential mechanism 31) in the first steering assist mode.

As a result, it is possible to alleviate the discomfort caused by the mismatch between the steering angle of the steering wheel 11 and the steered angle of the drive wheels 2FL and 2FR generated by the steering angle displacement suppression control in the first steering assist mode.

In addition, the reference correlation Cref defining the reference steering angle θsref (reference phase of the phase on the steering wheel 11 side of the differential mechanism 31) of the phase of the steering angle θs (phase on the steering wheel 11 side of the differential mechanism 31) corresponding to the phase of the pinion angle θp (phase on the rack and pinion 18 side of the differential mechanism 31) and the correlation allowable region Are with respect to the reference phase are prescribed in the differential mechanism controller (second controller), and the differential mechanism controller (second controller) 34 performs the phase shift suppression control in the first steering assist mode such that the phase of the steering angle θs (phase on the steering wheel 11 side of the differential mechanism 31) falls within the correlation allowable region Are.

As a result, it is possible to suppress the relative shift of the phase of the steering angle θs (phase on the steering wheel 11 side of the differential mechanism 31) generated by the steering angle displacement suppression control with respect to the phase of the reference steering angle θsref (reference phase on the steering wheel 11 side of the differential mechanism 31).

In addition, the differential mechanism controller (second controller) 34 performs the phase shift suppression control when the phase of the steering angle θs (phase on the steering wheel 11 side of the differential mechanism 31) deviates from the correlation allowable region Are.

As a result, when the phase of the steering angle θs (phase on the steering wheel 11 side of the differential mechanism 31) deviates from the correlation allowable region Are, it is possible to alleviate the discomfort caused by the mismatch between the steering angle of the steering wheel 11 and the steered angle of the drive wheels 2FL and 2FR generated by the steering angle displacement suppression control in the first steering assist mode.

In addition, the differential mechanism controller (second controller) 34 sets the phase of the reference steering angle θsref (reference phase on the steering wheel 11 side of the differential mechanism 31) as the target phase in the phase shift suppression control.

As a result, it is possible to make the phase of the steering angle θs (phase on the steering wheel 11 side of the differential mechanism 31) coincide with the phase of the reference steering angle θsref (reference phase on the steering wheel 11 side of the differential mechanism 31).

(Second Embodiment)

Figure 9:
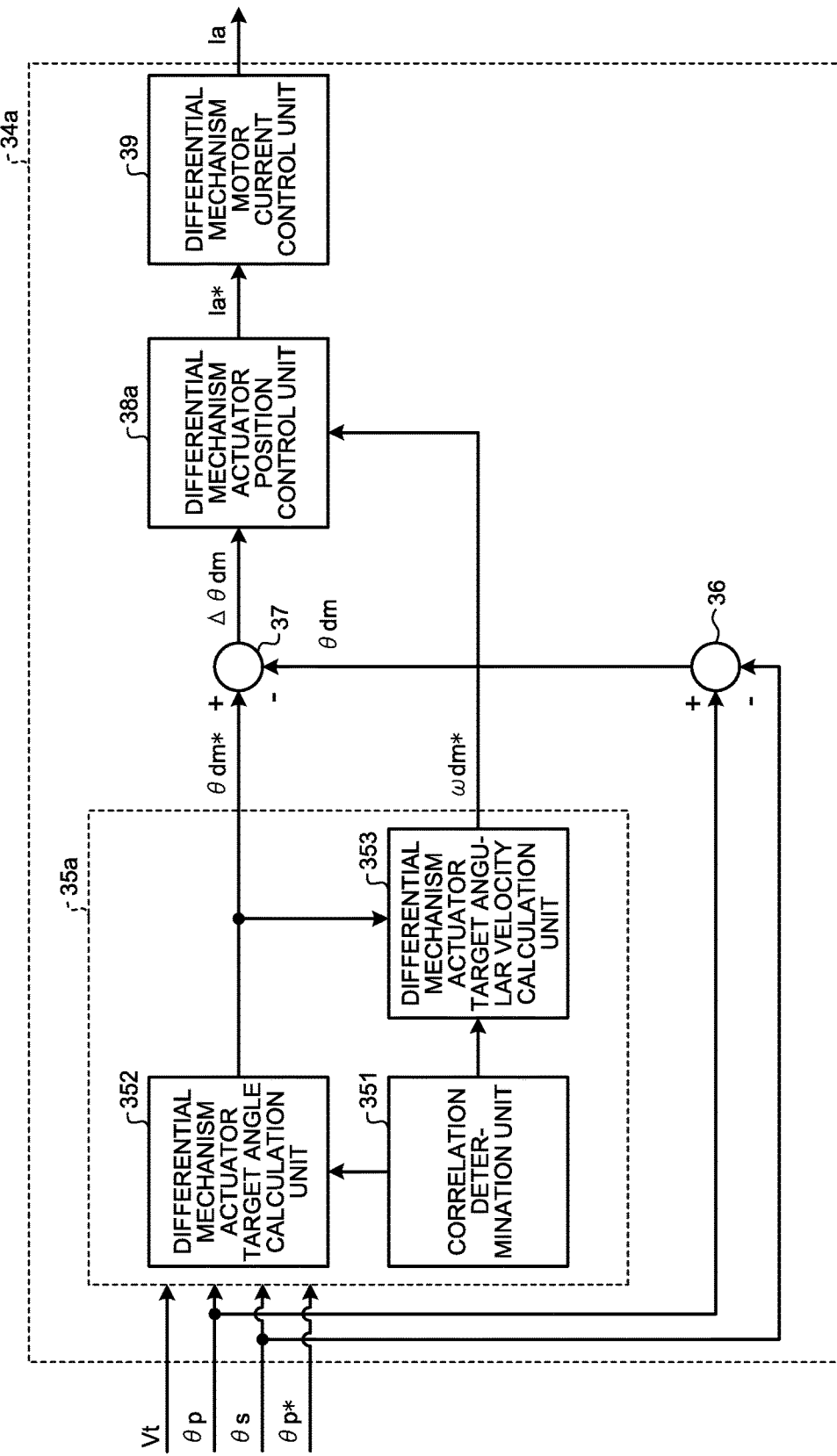
FIG. 9 is a diagram illustrating an example of an internal functional configuration of a differential mechanism controller of a vehicle steering control device according to a second embodiment.
Figure 10:
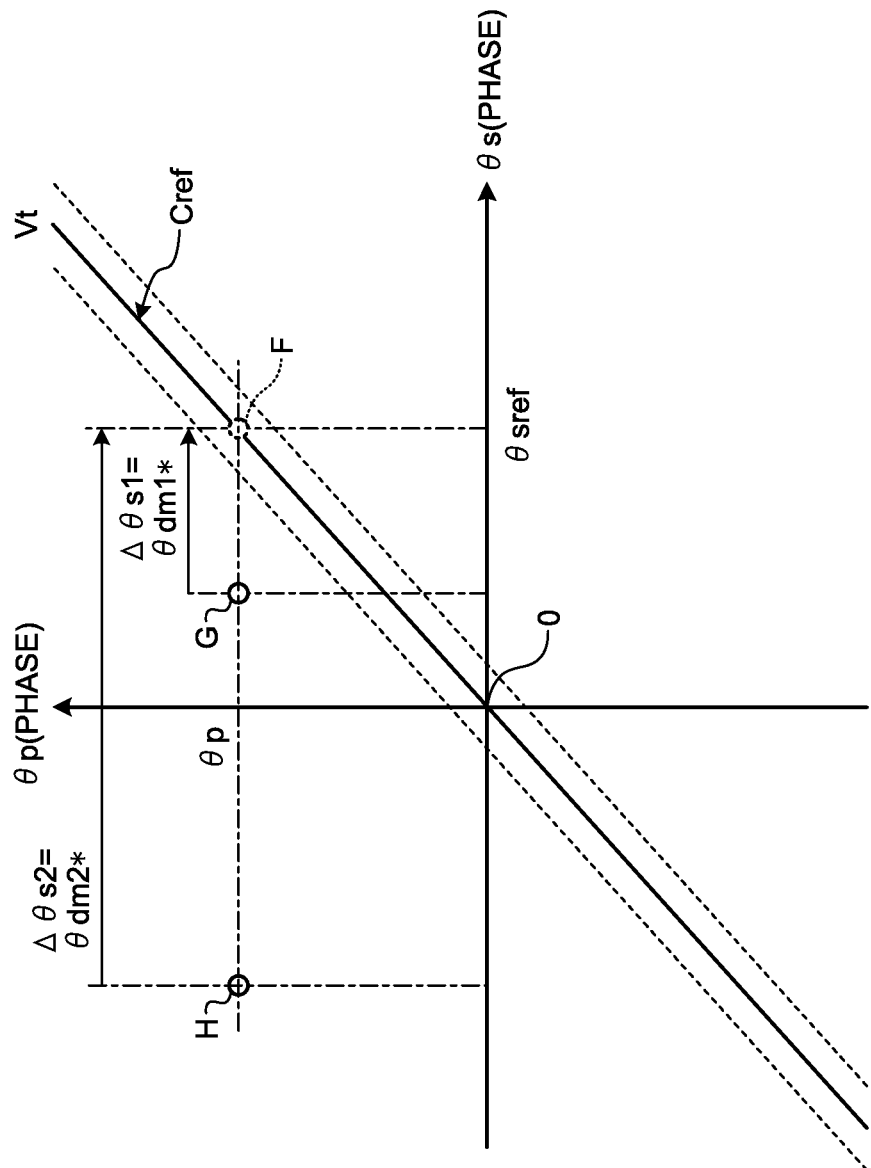
FIG. 10 is a graph illustrating an operation concept of phase shift suppression control in the vehicle steering control device according to the second embodiment.

FIG. 9 is a diagram illustrating an example of an internal functional configuration of a differential mechanism controller of a vehicle steering control device according to a second embodiment. FIG. 10 is a graph illustrating an operation concept of phase shift suppression control in the vehicle steering control device according to the second embodiment. Incidentally, configurations of the vehicle steering control device and an EPS controller according to the second embodiment are the same as those of the first embodiment described above, and thus the description thereof will be omitted here.

First, the operation concept of the phase shift suppression control in the vehicle steering control device 3 according to the second embodiment will be described here.

Needless to say, a behavior of the steering wheel 11 according to the phase shift suppression control of the present embodiment is a behavior different from the driver's intention. In the example illustrated in FIG. 10, an example in which a correlation between the pinion angle θp and the steering angle θs deviates from the correlation allowable region Are to become G within the correlation deviation region Dre by transition from the first steering assist mode to the second steering assist mode, and an example in which a correlation between the pinion angle θp and the steering angle θs deviates from the correlation allowable region Are to become H within the correlation deviation region Dre are illustrated.

In the example illustrated in FIG. 10, when a differential mechanism actuator target angle in the case where the correlation between the pinion angle θp and the steering angle θs is G is set as a first differential mechanism actuator target angle θdm1* and a differential mechanism actuator target angle in the case where the correlation between the pinion angle θp and the steering angle θs is H is set as a second differential mechanism actuator target angle θdm2*, θdm1*<θdm2*. Thus, if the angular velocity of the differential mechanism actuator 300 is constant in both the case where the correlation between the pinion angle θp and the steering angle θs is G and the case where the correlation between the pinion angle θp and the steering angle θs is H, the steering wheel 11 rapidly rotates, which affects the steering of the steering wheel 11 intentionally performed by the driver when a control amount (the second differential mechanism actuator target angle θdm2*) of the differential mechanism actuator 300 in the phase shift suppression control is large particularly as in the case illustrated in FIG. 10 where the correlation between the pinion angle θp and the steering angle θs is H.

In a differential mechanism controller 34a of the vehicle steering control device 3 according to the present embodiment, a differential mechanism actuator command value generation unit 35a is configured to include a differential mechanism actuator target angular velocity calculation unit 353.

If the correlation determination unit 351 determines that the pinion angle θp and the steering angle θs do not satisfy a predetermined correlation in the first steering assist mode, that is, when the target pinion angle θp* has not been input from the automatic steering control unit (host control unit) 50, the differential mechanism actuator target angular velocity calculation unit 353 outputs a target angular velocity (differential mechanism actuator target angular velocity) ωdm* in accordance with the differential mechanism actuator target angle θdm* output from the differential mechanism actuator target angle calculation unit 352 to a differential mechanism actuator position control unit 38a in the subsequent stage. More specifically, the differential mechanism actuator target angular velocity calculation unit 353 decreases the differential mechanism actuator target angular velocity ωdm* as the differential mechanism actuator target angle θdm*, that is, the control amount of the differential mechanism actuator 300 in the phase shift suppression control is larger. In addition, the differential mechanism actuator target angular velocity calculation unit 353 increases the differential mechanism actuator target angular velocity ωdm* as the differential mechanism actuator target angle θdm*, that is, the control amount of the differential mechanism actuator 300 in the phase shift suppression control is smaller.

Figure 11:
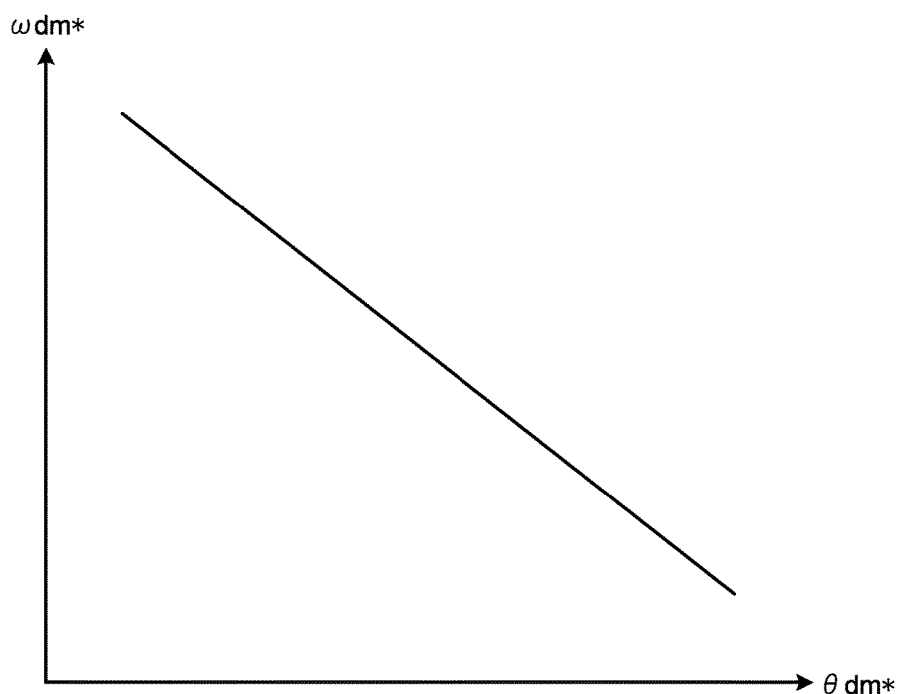
FIG. 11 is a graph illustrating an example of a relationship between a differential mechanism actuator target angle $\theta dm^*$ and a differential mechanism actuator target angular velocity $\omega dm^*$ in the phase shift suppression control of the vehicle steering control device according to the second embodiment.

FIG. 11 is a graph illustrating an example of a relationship between the differential mechanism actuator target angle θdm* and the differential mechanism actuator target angular velocity ωdm* in the phase shift suppression control of the vehicle steering control device according to the second embodiment. In the example illustrated in FIG. 11, the horizontal axis represents the differential mechanism actuator target angle θdm*, and the vertical axis represents the differential mechanism actuator target angular velocity ωdm*.

In the example illustrated in FIG. 11, an example expressed by a primary straight line in which the differential mechanism actuator target angle θdm* and the differential mechanism actuator target angular velocity ωdm* have a proportional relationship with a negative inclination is illustrated. Incidentally, the example of the primary straight line in which the differential mechanism actuator target angle θdm* and the differential mechanism actuator target angular velocity ωdm* have the proportional relationship with the negative inclination has been illustrated in the example illustrated in FIG. 11, but it may be configured such that the differential mechanism actuator target angle θdm* and the differential mechanism actuator target angular velocity ωdm* have an inverse relationship.

In addition, regarding the differential mechanism actuator target angular velocity ωdm* in accordance with the differential mechanism actuator target angle θdm*, for example, it may be configured such that the differential mechanism actuator target angular velocity calculation unit 353 has a table or an arithmetic expression that prescribes the relationship between the differential mechanism actuator target angle θdm* and the differential mechanism actuator target angular velocity ωdm*, or it may be configured such that the table or arithmetic expression that prescribes the relationship between the differential mechanism actuator target angle θdm* and the differential mechanism actuator target angular velocity ωdm* is stored in an external storage unit (not illustrated) and read out by the correlation determination unit 351.

Returning to FIG. 9, the differential mechanism actuator position control unit 38a controls a position of the differential mechanism actuator 300 based on a differential value Δθdm between the differential mechanism actuator target angle θdm* output from the differential mechanism actuator target angle calculation unit 352 and the differential mechanism actuator angle θdm, and the differential mechanism actuator target angular velocity ωdm* output from the differential mechanism actuator target angular velocity calculation unit 353. That is, the differential mechanism actuator position control unit 38a obtains the current command value (differential mechanism motor current command value) Ia* of the differential mechanism motor 32, necessary to offset the angular deviation Δθdm between the differential mechanism actuator target angle θdm* and the differential mechanism actuator angle θdm, in accordance with the differential mechanism actuator target angular velocity ωdm*, and outputs the obtained current command value Ia* to the differential mechanism motor current control unit 39.

The subsequent processing is the same as that of the first embodiment, and thus, the description thereof will be omitted here.

In the vehicle steering control device 3 according to the present embodiment, angle control of the differential mechanism actuator 300 is performed by performing current control of the differential mechanism motor 32 using the differential mechanism actuator target angular velocity ωdm* in accordance with the differential mechanism actuator target angle θdm at the time of transition from the second steering assist mode to the first steering assist mode. More specifically, the differential mechanism actuator target angular velocity ωdm* is decreased as the differential mechanism actuator target angle θdm* is larger. In addition, the differential mechanism actuator target angular velocity ωdm* is increased as the differential mechanism actuator target angle θdm* is smaller. As a result, when the differential mechanism actuator target angle θdm* is large and the control amount of the differential mechanism actuator 300 in the phase shift suppression control is large, it is possible to suppress rapid rotation of the steering wheel 11 and to reduce the influence on the driver's intentional steering of the steering wheel 11.

As described above, in the vehicle steering control device 3 according to the second embodiment, the differential mechanism controller (second controller) 34 controls the differential mechanism 31 using the angular velocity in accordance with the control amount in the phase shift suppression control until the phase of the steering angle θs (the phase on the steering wheel 11 side of the differential mechanism 31) reaches the target phase.

As a result, it is possible to perform the control in consideration of the influence on the driver's intentional steering of the steering wheel 11.

In addition, the differential mechanism controller (second controller) 34 decreases the angular velocity as the control amount in the phase shift suppression control increases and increases the angular velocity as the control amount in the phase shift suppression control decreases.

As a result, when the control amount in the phase shift suppression control is large, it is possible to suppress the rapid rotation of the steering wheel 11 and to reduce the influence on the driver's intentional steering of the steering wheel 11.

(Third Embodiment)

Figure 12:
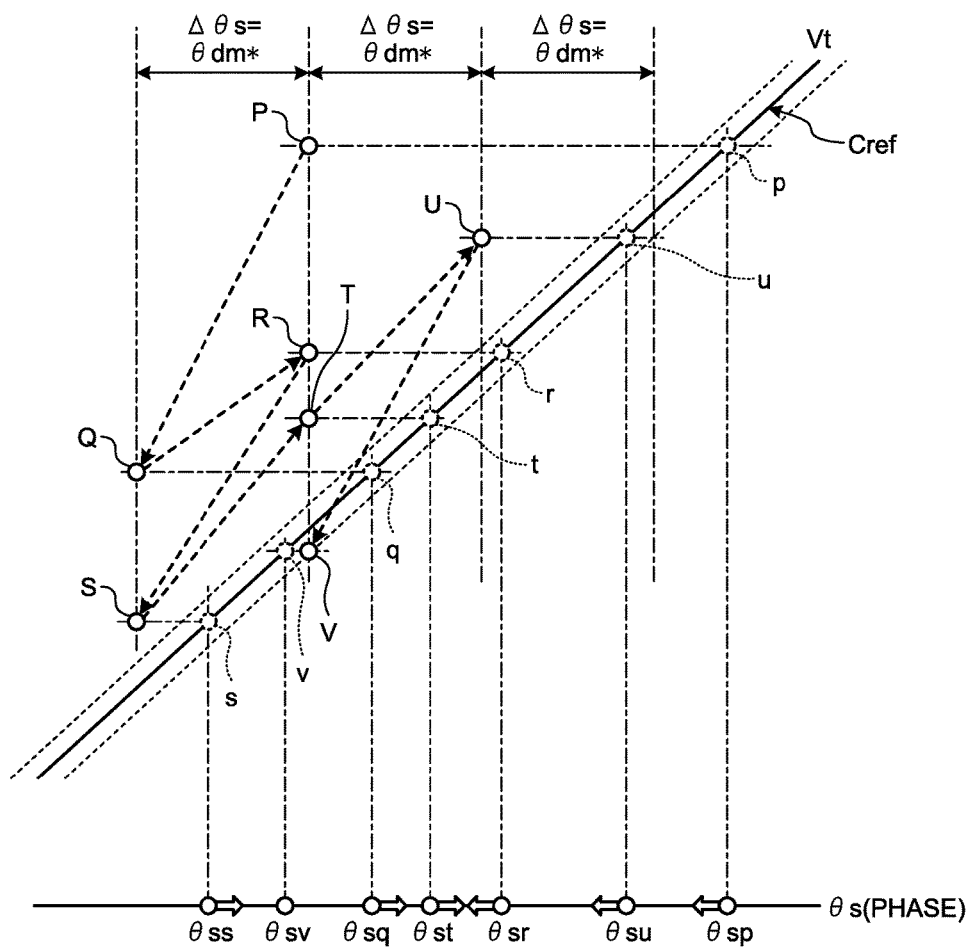
FIG. 12 is a graph illustrating an operation example of phase shift suppression control in a vehicle steering control device according to a third embodiment.

FIG. 12 is a graph illustrating an operation example of phase shift suppression control in a vehicle steering control device according to a third embodiment. In the example illustrated in FIG. 12, the operation example in a case where a reference phase point on the reference correlation Cref is changed in the order of p, q, r, s, t, and u is illustrated. Incidentally, configurations of the vehicle steering control device, an EPS control device, and a differential mechanism controller according to the third embodiment are the same as those of the first embodiment described above, and thus, the description thereof will be omitted here.

Although the description has been given in the first and second embodiments regarding the example in which the phase (reference phase) of the reference steering angle θsref on the reference correlation Cref corresponding to the pinion angle θp is set as the target phase in the phase shift suppression control and the phase angle Δθs until reaching the target phase is set as the differential mechanism actuator target angle θdm*, a description will be given in the present embodiment regarding an example in which a target phase in the phase shift suppression control is changed in accordance with a steering direction of the steering wheel 11 by a driver, that is, a change direction of a phase of the steering angle θs.

Although it is assumed that the reference steering angle θsref does not change when performing the phase shift suppression control in the first and second embodiments, there is a possibility that the driver steers the steering wheel 11 while the phase shift suppression control is being executed so that the reference steering angle θsref is shifted. In addition, the change direction of the phase of the steering angle θs when the driver operates the steering wheel 11 and the change direction of the phase of the steering angle θs by the phase shift suppression control do not necessarily coincide with each other in the first and second embodiments, and thus, there is a case where the driver's intentional steering of the steering wheel 11 is greatly affected. That is, if the steering direction of the steering wheel 11 by the driver is opposite to a control direction of the steering angle θs by the phase shift suppression control, the influence on the driver's intentional steering of the steering wheel 11 increases, which is a factor that increases discomfort and unease for the driver.

In the present embodiment, the target phase in the phase shift suppression control is changed in accordance with the change direction of the phase of the steering angle θs as described above. More specifically, when the phase of the steering angle θs changes in the left direction in the drawing, that is, in a direction in which the phase of the steering angle θs decreases, a phase shifted by a predetermined Δθs in the direction in which the phase of the steering angle θs decreases is set as a target phase in the phase shift suppression control, and the phase angle Δθs until reaching the target phase is set as the differential mechanism actuator target angle θdm*. In addition, when the phase of the steering angle θs changes in the right direction in the drawing, that is, in a direction in which the phase of the steering angle θs increases, a phase shifted by a predetermined Δθs in the direction in which the phase of the steering angle θs increases is set as a target phase in the phase shift suppression control, and the phase angle Δθs until reaching the target phase is set as the differential mechanism actuator target angle θdm*. Hereinafter, the phase shift suppression control in the vehicle steering control device 3 according to the third embodiment will be described with reference to FIG. 12.

As illustrated in FIG. 12, when the reference phase point on the reference correlation Cref changes in order of p, q, r, s, t, and u, a phase of the reference steering angle θsref on the reference correlation Cref changes in the order of θsp, θsq, θsr, θss, θst, and θsu. At this time, a change direction of the phases θsp, θsq, θsr, θss, θst, and θsu of the reference steering angle θsref on the reference correlation Cref is a direction indicated by an arrow in the drawing.

First, after transition from the second steering assist mode to the first steering assist mode, the phase θsp of the reference steering angle θsref is changing in a decreasing direction when a correlation between the pinion angle θp and the steering angle θs is P, and thus, the differential mechanism actuator target angle calculation unit 352 sets a phase shifted by Δθs in the decreasing direction of the phase of the steering angle θs at the correlation P as a target phase, and sets the phase angle Δθs until reaching the target phase as the differential mechanism actuator target angle θdm*. As a result, the correlation between the pinion angle θp and the steering angle θs becomes Q.

Subsequently, the phase θsq of the reference steering angle θsref is changing in an increasing direction when the correlation between the pinion angle θp and the steering angle θs is Q, and thus, the differential mechanism actuator target angle calculation unit 352 sets a phase shifted by Δθs in the increasing direction of the phase of the steering angle θs at the correlation Q as a target phase, and sets the phase angle Δθs until reaching the target phase as the differential mechanism actuator target angle θdm*. As a result, the correlation between the pinion angle θp and the steering angle θs becomes R.

Hereinafter, the phase shift suppression control is repeatedly executed until a correlation V falls within the correlation allowable region Are.

In the vehicle steering control device 3 according to the present embodiment, the target phase in the phase shift suppression control is changed in accordance with the change direction of the phase of the reference steering angle θsref at the time of transition from the second steering assist mode to the first steering assist mode. More specifically, the phase, shifted by the predetermined Δθs from the phase of the reference steering angle θsref in the left direction in the drawing, that is, the direction in which the phase of the reference steering angle θsref is changing, is set as the target phase, and the phase angle Δθs until reaching the target phase is set as the differential mechanism actuator target angle θdm*. As a result, it is possible to cause the steering direction of the steering wheel 11 by the driver, that is, the steering direction of the steering wheel 11 by the driver and the change direction of the phase of the steering angle θs by the phase shift suppression control to coincide with each other.

Incidentally, the description has been given in the above example assuming that the phase of the steering angle θs is changed, but the present embodiment configured such that the phase shift suppression control is not executed when the phase of the steering angle θs does not change. That is, the phase shift suppression control is executed only when the driver is steering the steering wheel 11. As a result, it is possible to reduce the influence on the influence on the driver's intentional steering of the steering wheel 11.

As described above, in the vehicle steering control device 3 according to the third embodiment, the differential mechanism controller (second controller) 34 changes the target phase in the phase shift suppression control in accordance with the change direction of the phase of the steering angle θs (the phase on the steering wheel 11 side of the differential mechanism 31).

As a result, it is possible to perform control in consideration of the steering direction of the steering wheel 11 by the driver.

In addition, the differential mechanism controller (second controller) 34 sets a predetermined phase, which coincides with the change direction of the phase of the steering angle θs (the phase on the steering wheel 11 side of the differential mechanism 31), as the target phase in the phase shift suppression control.

As a result, it is possible to cause the steering direction of the steering wheel 11 by the driver and the change direction of the steering angle θs (the phase on the steering wheel 11 side of the differential mechanism 31) by the phase shift suppression control to coincide with each other.

In addition, the differential mechanism controller (second controller) 34 performs the phase shift suppression control when the phase of the steering angle θs (the phase on the steering wheel 11 side of the differential mechanism 31) changes.

As a result, it is possible to execute the phase shift suppression control in which the steering direction of the steering wheel 11 by the driver and the change direction of the phase of the steering angle θs (phase on the steering wheel 11 side of the differential mechanism 31) by the phase shift suppression control are made to coincide with each other only when the driver is steering the steering wheel 11, and it is possible to reduce the influence on the driver's intentional steering of the steering wheel 11.

Incidentally, the example in which the EPS controller (first controller) 24 is incorporated in the EPS control unit 23 and the differential mechanism controller (second controller) 34 is incorporated in the differential mechanism control unit 33 has been described in the above embodiments, but it may be configured such that the EPS controller (first controller) 24 and the differential mechanism controller (second controller) 34 are incorporated in the same control unit, or the EPS control unit 23 and the differential mechanism control unit 33 may be configured as one control unit. The present invention is not limited by the configurations of such control units and the physical configurations of the EPS controller (first controller) 24 and the differential mechanism controller (second controller) 34.

REFERENCE SIGNS LIST

1 VEHICLE
2FL LEFT DRIVE WHEEL
2FR RIGHT DRIVE WHEEL
3 VEHICLE STEERING CONTROL DEVICE
11 STEERING WHEEL
12 STEERABLE SHAFT
12a STEERING SHAFT
12b PINION SHAFT
13 TORQUE SENSOR
14 FIRST ANGLE SENSOR
15 SECOND ANGLE SENSOR
16 VEHICLE SPEED SENSOR
18 RACK AND PINION
18a PINION
18b RACK
19 TIE ROD
20 EPS DEVICE
21 SPEED REDUCTION MECHANISM
22 EPS MOTOR
23 EPS CONTROL UNIT
24 EPS CONTROLLER (FIRST CONTROLLER)
25 EPS ASSIST CONTROL UNIT
26 EPS MOTOR ANGLE CONTROL UNIT
27 EPS MOTOR CURRENT COMMAND VALUE SWITCHING UNIT

28 EPS MOTOR CURRENT CONTROL UNIT
30 DIFFERENTIAL DEVICE
31 DIFFERENTIAL MECHANISM
32 DIFFERENTIAL MECHANISM MOTOR
33 DIFFERENTIAL MECHANISM CONTROL UNIT
34, 34a DIFFERENTIAL MECHANISM CONTROLLER (SECOND CONTROLLER)
35, 35a DIFFERENTIAL MECHANISM ACTUATOR COMMAND VALUE GENERATION UNIT
36 ADDER
37 ADDER
38, 38a DIFFERENTIAL MECHANISM ACTUATOR POSITION CONTROL UNIT
39 DIFFERENTIAL MECHANISM MOTOR CURRENT CONTROL UNIT
50 HOST CONTROL UNIT (AUTOMATIC STEERING CONTROL UNIT)
100 STEERING MECHANISM
200 EPS ACTUATOR
251 EPS MOTOR ASSIST TORQUE CALCULATION UNIT
252 FIRST EPS MOTOR CURRENT COMMAND VALUE CALCULATION UNIT
261 EPS MOTOR TARGET ANGLE CALCULATION UNIT
262 ADDER
263 SECOND EPS MOTOR CURRENT COMMAND VALUE CALCULATION UNIT
300 DIFFERENTIAL MECHANISM ACTUATOR
351 CORRELATION DETERMINATION UNIT
352 DIFFERENTIAL MECHANISM ACTUATOR TARGET ANGLE CALCULATION UNIT
353 DIFFERENTIAL MECHANISM ACTUATOR TARGET ANGULAR VELOCITY CALCULATION UNIT
A, B, C, D, E, F, P, Q, R, S, T, U, V CORRELATION
Are CORRELATION ALLOWABLE REGION
Cref REFERENCE CORRELATION
Dre CORRELATION DEVIATION REGION
Ia DIFFERENTIAL MECHANISM MOTOR CURRENT
Ia* DIFFERENTIAL MECHANISM MOTOR CURRENT COMMAND VALUE
Im EPS MOTOR CURRENT
Im* EPS MOTOR CURRENT COMMAND VALUE
Im1* FIRST EPS MOTOR CURRENT COMMAND VALUE
Im2* SECOND EPS MOTOR CURRENT COMMAND VALUE
p, q, r, s, t, u, v REFERENCE PHASE POINT
Ta ASSIST TORQUE
Tdm DIFFERENTIAL MECHANISM ACTUATOR TORQUE
Teps EPS ACTUATOR TORQUE
Ts STEERING TORQUE
Tsa SELF-ALIGNING TORQUE
α RATIO OF PINION ANGLE θp RELATIVE TO STEERING ANGLE θs
θdm DIFFERENTIAL MECHANISM ACTUATOR ANGLE
θdm* DIFFERENTIAL MECHANISM ACTUATOR TARGET ANGLE
θdm1* FIRST DIFFERENTIAL MECHANISM ACTUATOR TARGET ANGLE
θdm2* SECOND DIFFERENTIAL MECHANISM ACTUATOR TARGET ANGLE
θeps EPS ACTUATOR ANGLE
θeps* EPS ACTUATOR TARGET ANGLE
θh ANGULAR DISPLACEMENT
θm EPS MOTOR ANGLE
θm* EPS MOTOR TARGET ANGLE
θs STEERING ANGLE
θsp, θsq, θsr, θss, θst, θsu, θsv REFERENCE STEERING ANGLE
θsref REFERENCE STEERING ANGLE
θs− STEERING ANGLE LOWER LIMIT VALUE
θs+ STEERING ANGLE UPPER LIMIT VALUE
θp PINION ANGLE
θp* TARGET PINION ANGLE
Δθdm ANGULAR DEVIATION (DIFFERENTIAL MECHANISM ACTUATOR)
Δθm ANGULAR DEVIATION (EPS MOTOR)

The invention claimed is:

1. A vehicle steering control device comprising:
a first controller that controls a speed reduction mechanism in a steering mechanism in which a steering wheel and a rack-and-pinion that steers and drives a drive wheel are connected via a differential mechanism and the speed reduction mechanism is provided in a rack of the rack-and-pinion; and
a second controller that controls the differential mechanism in the steering mechanism,
wherein
a first steering assist mode of assisting steering of a driver and
a second steering assist mode of performing steering independently from the steering of the driver are provided
as operation modes of the first controller and the second controller,
a reference correlation defining a reference phase on a side of the steering wheel of the differential mechanism corresponding to a phase on a side of the rack-and-pinion of the differential mechanism, and a correlation allowable region of the phase on the side of the steering wheel of the differential mechanism with respect to the reference phase are prescribed in the second controller,
when the phase on the side of the steering wheel of the differential mechanism deviates from the correlation allowable region in the first steering assist mode,
the second controller controls
the differential mechanism at angular velocity in accordance with a control amount of the differential mechanism
using the reference phase on the side of the steering wheel of the differential mechanism corresponding to the phase on the side of the rack-and-pinion of the differential mechanism as a target phase, and
a phase angle until the phase on the side of the steering wheel of the differential mechanism reaches the target phase as a target angle.

2. The vehicle steering control device according to claim 1, wherein
the second controller decreases
the angular velocity as the control amount increases, and increases the angular velocity as the control amount decreases.

3. The vehicle steering control device according to claim 1, wherein
the first steering assist mode and the second steering assist mode are switched based on an external command.

4. A vehicle steering control device comprising:
a first controller that controls a speed reduction mechanism in a steering mechanism in which a steering wheel and a rack-and-pinion that steers and drives a drive wheel are connected via a differential mechanism and the speed reduction mechanism is provided in a rack of the rack-and-pinion; and a second controller that controls the differential mechanism in the steering mechanism, wherein a first steering assist mode of assisting steering of a driver and a second steering assist mode of performing steering independently from the steering of the driver are provided as operation modes of the first controller and the second controller, a reference correlation defining a reference phase on a side of the steering wheel of the differential mechanism corresponding to a phase on a side of the rack-and-pinion of the differential mechanism, and a correlation allowable region of the phase on the side of the steering wheel of the differential mechanism with respect to the reference phase are prescribed in the second controller, when the phase on the side of the steering wheel of the differential mechanism deviates from the correlation allowable region in the first steering assist mode, the second controller controls the differential mechanism using a phase shifted by a predetermined phase in a direction of a change of the phase on the side of the steering wheel of the differential mechanism corresponding to the phase on the side of the rack-and-pinion of the differential mechanism, as a target phase, and a phase angle until the phase on the side of the steering wheel of the differential mechanism reaches the target phase as a target angle.

5. The vehicle steering control device according to claim 4, wherein when the phase on the side of the steering wheel of the differential mechanism changes in a decreasing direction, the second controller uses a phase shifted by the predetermined phase in the direction as the target phase.

6. The vehicle steering control device according to claim 4, wherein when the phase on the side of the steering wheel of the differential mechanism changes in an increasing direction, the second controller uses a phase shifted by the predetermined phase in the direction as the target phase.

7. The vehicle steering control device according to claim 4, wherein the first steering assist mode and the second steering assist mode are switched based on an external command.

* * * * *